(12) United States Patent
Ishida et al.

(10) Patent No.: US 10,507,837 B2
(45) Date of Patent: Dec. 17, 2019

(54) CONTROL DEVICE FOR VEHICLE DRIVE TRANSFER DEVICE

(71) Applicant: AISIN AW CO., LTD., Anjo-shi, Aichi-ken (JP)

(72) Inventors: Shoichi Ishida, Toyoake (JP); Kohei Tsuda, Nishio (JP); Keiichirou Kusabe, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 47 days.

(21) Appl. No.: 15/527,522

(22) PCT Filed: Dec. 25, 2015

(86) PCT No.: PCT/JP2015/086436
§ 371 (c)(1),
(2) Date: May 17, 2017

(87) PCT Pub. No.: WO2016/104800
PCT Pub. Date: Jun. 30, 2016

(65) Prior Publication Data
US 2017/0327122 A1 Nov. 16, 2017

(30) Foreign Application Priority Data

Dec. 25, 2014 (JP) .................................. 2014-263425

(51) Int. Cl.
*B60W 30/19* (2012.01)
*B60K 6/48* (2007.10)
(Continued)

(52) U.S. Cl.
CPC ............... *B60W 30/19* (2013.01); *B60K 6/48* (2013.01); *B60W 10/08* (2013.01); *B60W 20/20* (2013.01);
(Continued)

(58) Field of Classification Search
CPC .... B60K 6/48; B60L 2240/423; B60W 10/02; B60W 10/08; B60W 20/20;
(Continued)

(56) References Cited

U.S. PATENT DOCUMENTS 5,951,614 A 9/1999 Tabata et al.
6,128,565 A * 10/2000 Tsutsui .................. F16H 61/061
477/107

(Continued)

FOREIGN PATENT DOCUMENTS

CN 102770295 A 11/2012
JP H09-331602 A 12/1997
(Continued)

OTHER PUBLICATIONS

Apr. 5, 2016 International Search Report issued with International Patent Application No. PCT/JP2015/086436.

*Primary Examiner* — Angelina Shudy
(74) *Attorney, Agent, or Firm* — Oliff PLC

(57) ABSTRACT

A control device that controls a vehicle drive transfer device in which a speed change device that includes a plurality of engagement devices and that selectively establishes one of a plurality of shift speeds with different speed ratios in accordance with a state of engagement of the plurality of engagement devices is provided in a power transfer path that connects between a drive force source and wheels.

10 Claims, 10 Drawing Sheets

(51) Int. Cl.
  *B60W 10/08* (2006.01)
  *B60W 20/20* (2016.01)
  *F16H 59/46* (2006.01)
  *F16H 61/00* (2006.01)
  *F16H 61/06* (2006.01)
  *B60W 10/02* (2006.01)

(52) U.S. Cl.
  CPC ......... *F16H 59/46* (2013.01); *F16H 61/0009* (2013.01); *F16H 61/061* (2013.01); *B60L 2240/423* (2013.01); *B60W 10/02* (2013.01); *B60W 2510/102* (2013.01); *B60W 2710/083* (2013.01); *B60W 2710/1016* (2013.01); *F16H 2061/0078* (2013.01); *F16H 2061/0087* (2013.01)

(58) Field of Classification Search
  CPC ..... B60W 2510/102; B60W 2710/083; B60W 2710/1016; B60W 30/19; F16H 2061/0078; F16H 2061/0087; F16H 59/46; F16H 61/0009; F16H 61/061
  USPC .......................................................... 701/22
  See application file for complete search history.

(56) References Cited

U.S. PATENT DOCUMENTS

| | | | |
|---|---|---|---|
| 6,503,165 B1 * | 1/2003 | Kubo | F16H 61/061 475/117 |
| 2004/0106497 A1 | 6/2004 | Ayabe et al. | |
| 2004/0224820 A1 * | 11/2004 | Matsumura | B60W 10/02 477/107 |
| 2007/0012538 A1 * | 1/2007 | Katakura | F16H 61/061 192/3.61 |
| 2009/0306868 A1 * | 12/2009 | Akebono | F16H 61/061 701/60 |
| 2010/0167871 A1 * | 7/2010 | Inagaki | B60K 6/48 477/5 |
| 2011/0106355 A1 | 5/2011 | Tsuda et al. | |
| 2011/0106356 A1 * | 5/2011 | Tsuda | B60W 10/08 701/22 |
| 2011/0212809 A1 * | 9/2011 | Tsutsui | F16H 61/02 477/5 |
| 2011/0239801 A1 * | 10/2011 | Inagaki | B60K 6/387 74/473.1 |
| 2012/0202646 A1 * | 8/2012 | Suzuki | B60W 10/02 477/5 |
| 2013/0109533 A1 * | 5/2013 | Matsubara | F16H 61/061 477/80 |
| 2013/0292223 A1 * | 11/2013 | Nedorezov | B60W 10/11 192/220 |
| 2015/0369359 A1 * | 12/2015 | Tsutsui | F16H 59/14 477/115 |
| 2016/0010746 A1 * | 1/2016 | Turner | F16H 61/0213 701/51 |

FOREIGN PATENT DOCUMENTS

| | | |
|---|---|---|
| JP | 2004-183758 A | 7/2004 |
| JP | 2005-106244 A | 4/2005 |
| JP | 2008-014421 A | 1/2008 |
| JP | 2011-94757 A | 5/2011 |

* cited by examiner

FIG. 4

|      | C1 | C2 | C3 | B1 | B2  | OWC |
|------|----|----|----|----|-----|-----|
| 1st  | ○  |    |    |    | (○) | △   |
| 2nd  | ○  |    |    | ○  |     |     |
| 3rd  | ○  |    | ○  |    |     |     |
| 4th  | ○  | ○  |    |    |     |     |
| 5th  |    | ○  | ○  |    |     |     |
| 6th  |    | ○  |    | ○  |     |     |
| Rev  |    |    | ○  |    | ○   |     |

CONTROL DEVICE FOR VEHICLE DRIVE TRANSFER DEVICE

BACKGROUND

The present disclosure relates to a control device that controls a vehicle drive transfer device in which a speed change device that includes a plurality of engagement devices and that selectively establishes one of a plurality of shift speeds with different speed ratios in accordance with the state of engagement of the plurality of engagement devices is provided in a power transfer path connecting between a drive force source and wheels.

A technology described in Japanese Patent Application Publication No. 9-331602 mentioned below, for example, is already known as the control device described above. In the technology described in Japanese Patent Application Publication No. 9-331602, in speed change control in which the shift speed of a speed change device is switched among shift speeds with different speed ratios, torque down control in which output torque from a drive force source is lowered is performed during inertia phase control in which the rotational speed on the input side of the speed change device is varied as illustrated in FIGS. 8, 9, etc. of Japanese Patent Application Publication No. 9-331602.

SUMMARY

In order to suppress fluctuations in output torque due to the speed change control, it is necessary to consider not only control for the output torque from the drive force source but also control for an engagement pressure for an engagement-side engagement device that is engaged for shifting. In the technology according to Japanese Patent Application Publication No. 9-331602, however, control for the engagement pressure for the engagement-side engagement device for suppressing fluctuations in output torque is not particularly taken into consideration.

An exemplary aspect of the present disclosure provides a control device capable of suppressing fluctuations in output torque during shifting by appropriately controlling an engagement pressure for an engagement-side engagement device and input torque transferred from a drive force source to a speed change device.

In view of the foregoing, according to an exemplary aspect of the disclosure, a control device that controls a vehicle drive transfer device in which a speed change device that includes a plurality of engagement devices and that selectively establishes one of a plurality of shift speeds with different speed ratios in accordance with a state of engagement of the plurality of engagement devices is provided in a power transfer path that connects between a drive force source and wheels, the control device includes an electronic control unit that: controls an engagement pressure for an engagement-side engagement device which is one of the engagement devices that is engaged to perform shifting in which switching is made to a shift speed with a different speed ratio; controls an engagement pressure for a disengagement-side engagement device which is one of the engagement devices that is disengaged to perform the shifting; and changes input torque transferred to an input shaft of the speed change device during the shifting, in which when distribution of torque transfer between the engagement-side engagement device and the disengagement-side engagement device is varied by controlling the engagement pressures for the engagement-side engagement device and the disengagement-side engagement device during the shifting, the electronic control unit performs specific engagement pressure control in which the engagement pressure for the engagement-side engagement device is varied at a constant variation rate or a variation rate that is higher than the constant variation rate at a time of start of variation.

With this characteristic configuration, the electronic control unit changes the input torque during the shifting, and thus it is possible to control variations in output torque transferred from the speed change device to a wheel side in a period since before the start of the shifting until after the end of the shifting. In addition, when the distribution of torque transfer between the engagement-side engagement device and the disengagement-side engagement device is varied by the electronic control unit by controlling the engagement pressures for the engagement-side engagement device and the disengagement-side engagement device, the output torque which matches the engagement pressure for the engagement-side engagement device in the slipping engagement state is transferred to the wheel side. When the distribution of torque transfer is varied, the electronic control unit performs the specific engagement pressure control in which the engagement pressure for the engagement-side engagement device is varied at a constant variation rate or a variation rate that is higher than the constant variation rate at the time of the start of the variation. Such specific engagement pressure control is enabled by varying the engagement pressure for the engagement-side engagement device on the basis of the value of the input torque, which is changed by the input torque change section, after the end of the shifting (hereinafter referred to as "post-shifting input torque"). By performing such specific engagement pressure control, fluctuations in output torque during the shifting can be suppressed.

BRIEF DESCRIPTION OF THE DRAWINGS

FIG. 4 is an operation table of a speed change device according to the first embodiment.

DETAILED DESCRIPTION OF EMBODIMENTS

1. First Embodiment

Figure 1:
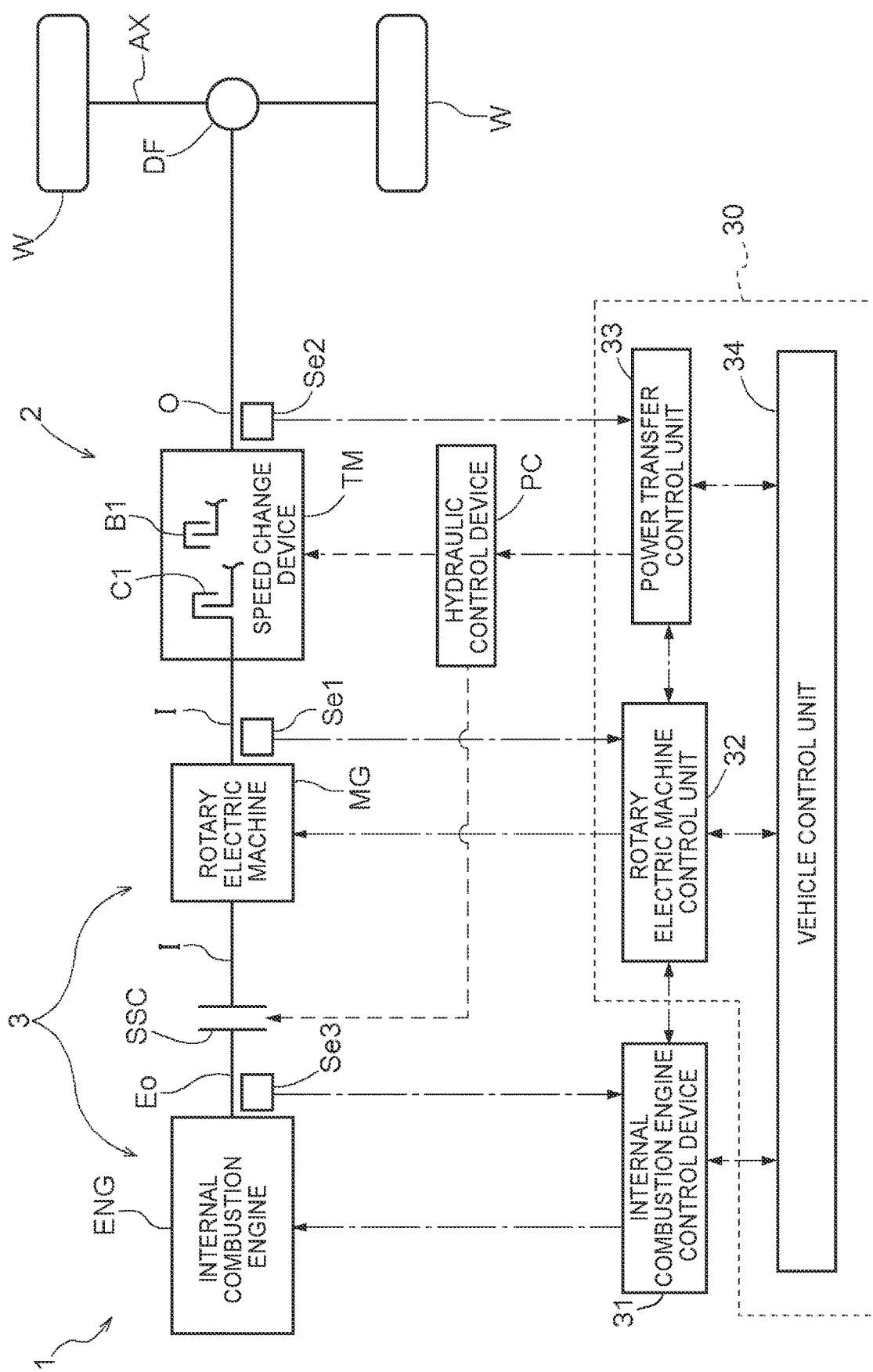
FIG. 1 is a schematic diagram illustrating a schematic configuration of a vehicle drive transfer device and a control device according to an embodiment.

A control device 30 (i.e., electronic control unit) for a vehicle drive transfer device 1 (hereinafter referred to simply as a "control device 30") according to an embodiment will be described with reference to the drawings. FIG. 1 is a schematic diagram illustrating a schematic configuration of the vehicle drive transfer device 1 and the control device 30 according to the embodiment. In the drawing, the solid lines each indicate a drive force transfer path, the broken lines each indicate a working oil supply path, and the dash-and-dot lines each indicate a signal transfer path. In the vehicle drive transfer device 1, a speed change device TM is provided in a power transfer path 2 that connects between a drive force source 3 and wheels W. The speed change device TM includes a plurality of engagement devices C1, B1, . . . , and selectively establishes one of a plurality of shift speeds with different speed ratios in accordance with the state of engagement of the plurality of engagement devices C1, B1, . . . .

In the embodiment, the drive force source 3 includes an internal combustion engine ENG and a rotary electric machine MG. The rotary electric machine MG, the speed change device TM, and the wheels W are provided in the power transfer path 2 which connects between the internal combustion engine ENG and the wheels W, and arranged in this order from the internal combustion engine ENG side. Here, the rotary electric machine MG is drivably coupled to an input shaft I of the speed change device TM, and the internal combustion engine ENG is drivably coupled to the input shaft I via a first engagement device SSC. In the embodiment, in this way, the first engagement device SSC, the rotary electric machine MG, and the speed change device TM are provided in the power transfer path 2 which connects between the internal combustion engine ENG and the wheels W, and arranged in this order from the internal combustion engine ENG side.

The term "drivably coupled" as used herein refers to a state in which two rotary elements are coupled to each other in such a way that allows transfer of a drive force, which includes a state in which the two rotary elements are coupled so as to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

A hybrid vehicle includes the control device 30 which controls the vehicle drive transfer device 1. The control device 30 according to the embodiment has a rotary electric machine control unit 32 that controls the rotary electric machine MG, a power transfer control unit 33 that controls the speed change device TM and the first engagement device SSC, and a vehicle control unit 34 that integrates these control devices to control the vehicle drive transfer device 1. The hybrid vehicle also includes an internal combustion engine control device 31 that controls the internal combustion engine ENG.

Figure 2:
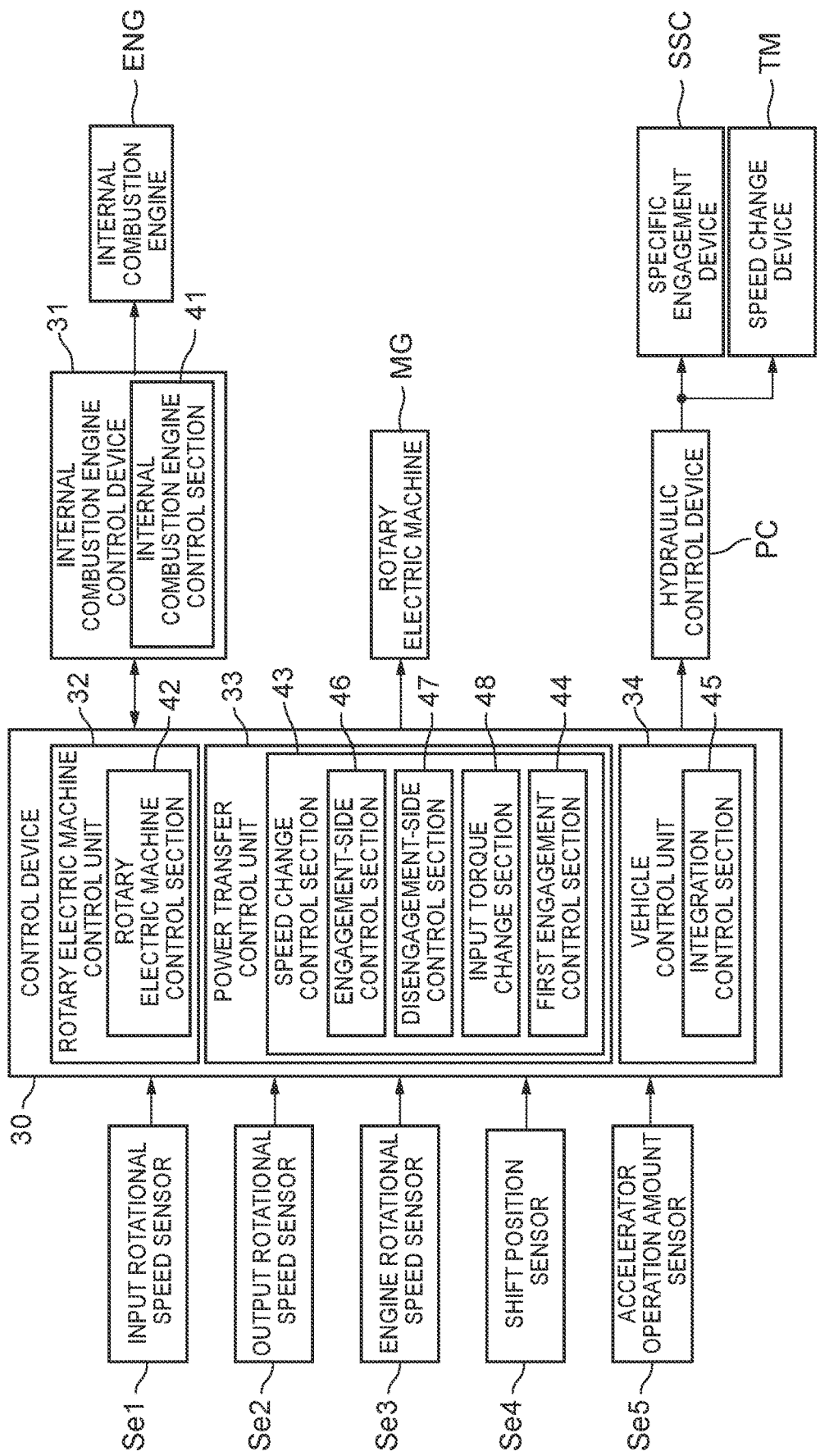
FIG. 2 is a block diagram illustrating a schematic configuration of a control device according to a first embodiment.

As illustrated in FIG. 2, the control device 30 includes function sections such as a speed change control section 43. The speed change control section 43 has an engagement-side control section 46, a disengagement-side control section 47, and an input torque change section 48. The engagement-side control section 46 controls the engagement pressure for an engagement-side engagement device which is an engagement device that is engaged to perform shifting in which switching is made to a shift speed with a different speed ratio. The disengagement-side control section 47 controls the engagement pressure for a disengagement-side engagement device which is an engagement device that is disengaged to perform shifting. The input torque change section 48 changes input torque transferred from the drive force source 3 side to the input shaft I of the speed change device during shifting. When the distribution of torque transfer between the engagement-side engagement device and the disengagement-side engagement device is varied by the engagement-side control section 46 and the disengagement-side control section 47 by controlling the engagement pressures for the engagement-side engagement device and the disengagement-side engagement device during shifting, the engagement-side control section 46 performs specific engagement pressure control in which the engagement pressure for the engagement-side engagement device is varied at a constant variation rate or a variation rate that is higher than the constant variation rate at the time of the start of the variation (see FIG. 6).

The vehicle drive transfer device 1 and the control device 30 according to the embodiment will be described in detail below.

1-1. Configuration of Vehicle Drive Transfer Device 1

First, the configuration of the vehicle drive transfer device 1 of the hybrid vehicle according to the embodiment will be described. As illustrated in FIG. 1, the hybrid vehicle is a parallel-type hybrid vehicle which includes the internal combustion engine ENG and the rotary electric machine MG as the drive force source 3 for the vehicle, and in which the internal combustion engine ENG and the rotary electric machine MG are drivably coupled in series with each other. The hybrid vehicle includes the speed change device TM, which transfers rotation of the internal combustion engine ENG and the rotary electric machine MG transferred to the input shaft I to an output shaft O with the rotational speed changed and with torque converted.

The internal combustion engine ENG is a heat engine driven by combustion of fuel. Various internal combustion engines known in the art such as gasoline engines and diesel engines, for example, may be used as the internal combustion engine ENG. In the example, an engine output shaft Eo such as a crankshaft of the internal combustion engine ENG is selectively drivably coupled via the first engagement device SSC to the input shaft I which is drivably coupled to the rotary electric machine MG. That is, the internal combustion engine ENG is selectively drivably coupled to the rotary electric machine MG via the first engagement device SSC which is a friction engagement device. The engine output shaft Eo is provided with a damper (not illustrated), and configured to be able to transfer rotation to the wheel W side with fluctuations in output torque and rotational speed due to intermittent combustion of the internal combustion engine ENG damped.

Figure 3:
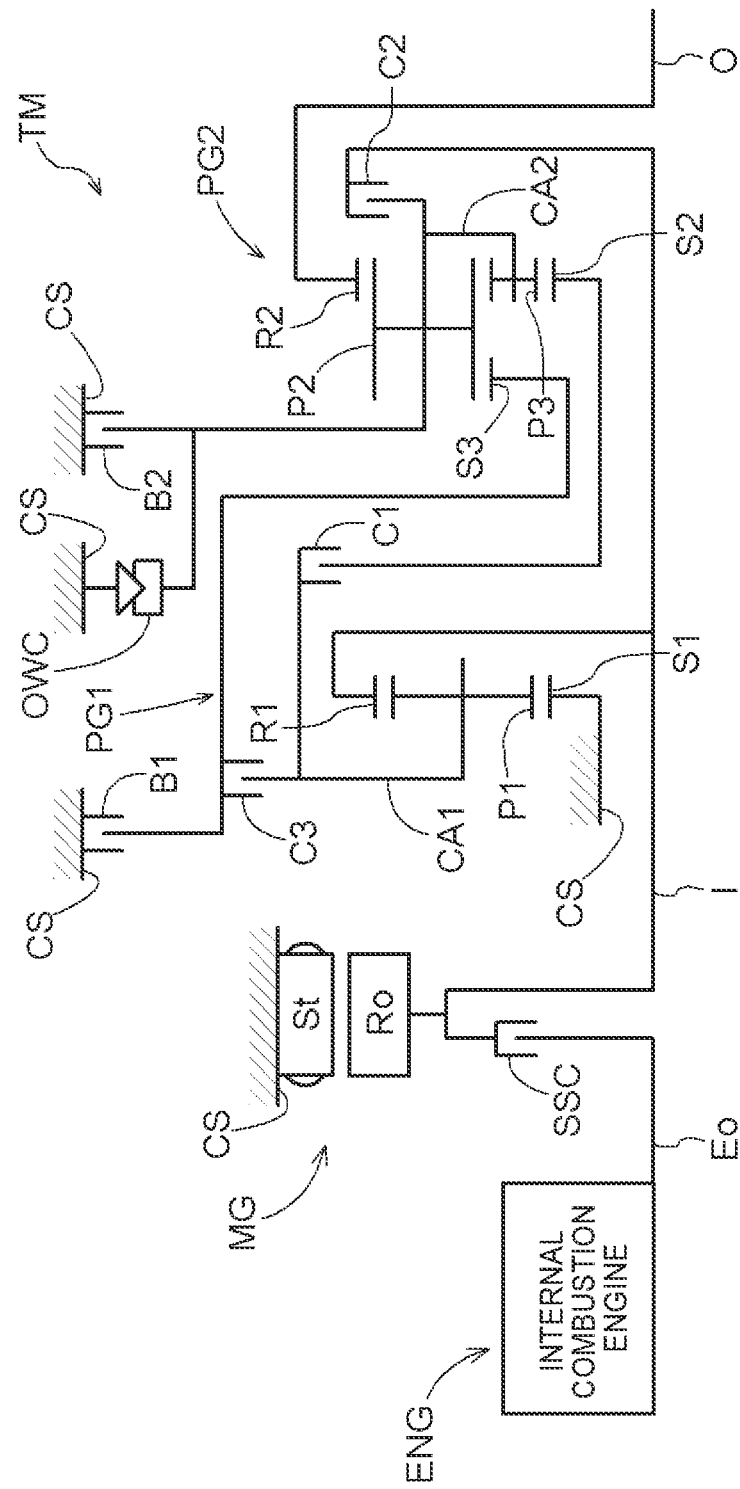
FIG. 3 is a skeleton diagram of a vehicle drive transfer device according to the first embodiment.

The rotary electric machine MG has a stator St fixed to a case CS that houses the vehicle drive transfer device 1 and a rotor Ro rotatably supported at a radially inner position corresponding to the stator (see FIG. 3). The rotor Ro of the rotary electric machine MG is drivably coupled so as to rotate together with the input shaft I. The rotary electric machine MG is electrically connected to a battery that serves as an electricity accumulation device via an inverter that performs a DC/AC conversion. The rotary electric machine MG can function as a motor (electric motor) that is supplied with electric power to generate power and as a generator (electric generator) that is supplied with power to generate electric power. That is, the rotary electric machine MG performs power running using electric power supplied from the battery via the inverter, or generates electric power using a rotational drive force transferred from the internal combustion engine ENG or the wheels W. The generated electric power is accumulated in the battery via the inverter.

The speed change device TM is drivably coupled to the input shaft I, to which the drive force source 3 is drivably coupled. In the embodiment, the speed change device TM is a stepped automatic speed change device that provides a plurality of shift speeds with different speed ratios (gear ratios). In order to establish the plurality of shift speeds, the speed change device TM includes a gear mechanism such as a planetary gear mechanism and the plurality of engagement devices C1, B1, . . . . The speed change device TM transfers rotation of the input shaft I to the output shaft O with the rotational speed changed in accordance with the speed ratio of each shift speed and with torque converted. The torque which is transferred from the speed change device TM to the output shaft O is distributed and transferred to two, left and right, axles AX via an output differential gear device DF to be transferred to the wheels W which are drivably coupled to the axles AX. Here, the term "speed ratio (gear ratio)" refers to the ratio of the rotational speed of the input shaft I to the rotational speed of the output shaft O for a case where each shift speed is established in the speed change device TM. The term "speed ratio (gear ratio)" as used herein corresponds to a value obtained by dividing the rotational speed of the input shaft I by the rotational speed of the output shaft O. That is, the rotational speed of the output shaft O is obtained by dividing the rotational speed of the input shaft I by the speed ratio. In addition, the torque which is transferred from the speed change device TM to the output shaft O is obtained by multiplying torque transferred from the input shaft I to the speed change device TM by the speed ratio.

Figure 4:
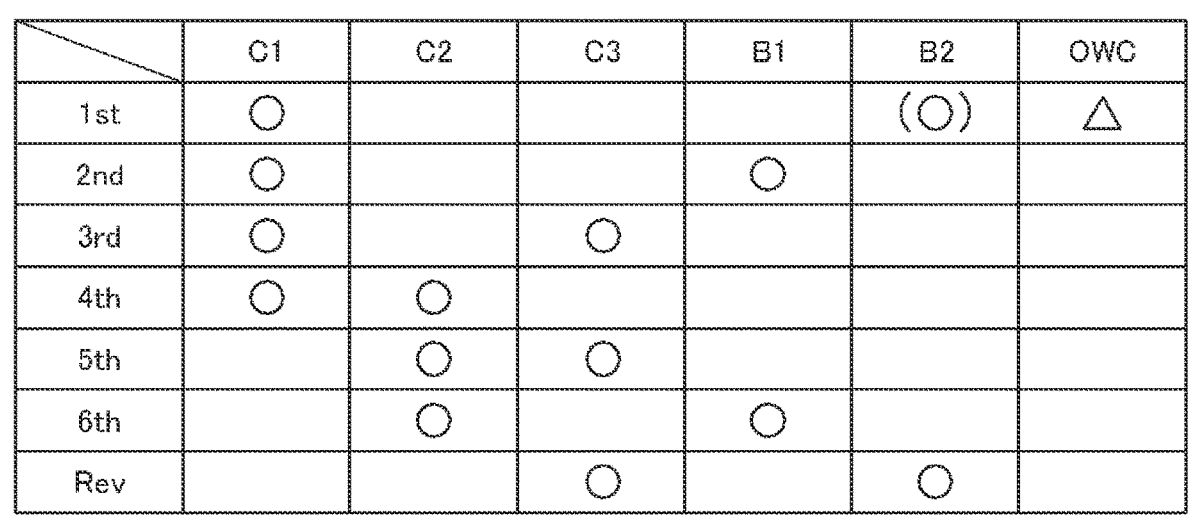

In the embodiment, as illustrated in the operation table of FIG. 4, the speed change device TM provides six shift speeds (a first speed 1st, a second speed 2nd, a third speed 3rd, a fourth speed 4th, a fifth speed 5th, and a sixth speed 6th) with different speed ratios (speed reduction ratios) as forward shift speeds. In order to establish the shift speeds, the speed change device TM includes gear mechanisms including a first planetary gear mechanism PG1 and a second planetary gear mechanism PG2, and six engagement devices C1, C2, C3, B1, B2, and OWC. Switching is made among the six shift speeds by selectively engaging the plurality of engagement devices C1, B1, . . . by changing the rotational state of each rotary element of the first planetary gear mechanism PG1 and the second planetary gear mechanism PG2 by controlling engagement and disengagement of the plurality of engagement devices C1, B1, . . . excluding the one-way clutch OWC. Besides the six shift speeds described above, the speed change device TM also provides one reverse shift speed Rev.

In FIG. 4, the symbol "○" indicates that each engagement device is in the engaged state, and the presence of "no symbol" indicates that each engagement device is in the disengaged state. The symbol "(○)" indicates that the engagement device is in the engaged state with engine braking in operation or the like. In addition, the symbol "Δ" indicates that the engagement device is in the disengaged state in the case where the engagement device is rotated in one direction, and that the engagement device is in the engaged state in the case where the engagement device is rotated in the other direction.

The first speed (1st) is established by engaging the first clutch C1 and the one-way clutch OWC. When engine braking is in operation or the like, the first speed is established by engaging the first clutch C1 and the second brake B2. The second speed (2nd) is established by engaging the first clutch C1 and the first brake B1. The third speed (3rd) is established by engaging the first clutch C1 and the third clutch C3. The fourth speed (4th) is established by engaging the first clutch C1 and the second clutch C2. The fifth speed (5th) is established by engaging the second clutch C2 and the third clutch C3. The sixth speed (6th) is established by engaging the second clutch C2 and the first brake B1. The reverse shift speed (Rev) is established by engaging the third clutch C3 and the second brake B2. The shift speeds form a sequence of the first speed, the second speed, the third speed, the fourth speed, the fifth speed, and the sixth speed when arranged in the descending order of the speed ratio (speed reduction ratio) between the input shaft I (internal combustion engine ENG) and the output shaft O.

As illustrated in FIG. 3, the first planetary gear mechanism PG1 is a single-pinion type planetary gear mechanism that includes three rotary elements, namely a carrier CA1 that supports a plurality of pinion gears P1, and a sun gear S1 and a ring gear R1 that are each meshed with the pinion gears P1. The second planetary gear mechanism PG2 is a Ravigneaux type planetary gear mechanism that includes four rotary elements, namely two sun gears that include a first sun gear S2 and a second sun gear S3, a ring gear R2, and a common carrier CA2 that supports a long pinion gear P2 meshed with both the first sun gear S2 and the ring gear R2 and a short pinion gear P3 meshed with the long pinion gear P2 and the second sun gear S3.

The sun gear S1 of the first planetary gear mechanism PG1 is fixed to the case CS which serves as a non-rotary member. The carrier CA1 is drivably coupled so as to selectively rotate together with the second sun gear S3 of the second planetary gear mechanism PG2 by the third clutch C3, drivably coupled so as to selectively rotate together with the first sun gear S2 of the second planetary gear mechanism PG2 by the first clutch C1, and selectively made stationary with respect to the case CS by the first brake B1. The ring gear R1 is drivably coupled so as to rotate together with the input shaft I.

The first sun gear S2 of the second planetary gear mechanism PG2 is drivably coupled so as to selectively rotate together with the carrier CA1 of the first planetary gear mechanism PG1 by the first clutch C1. The carrier CA2 is drivably coupled so as to rotate together with the input shaft I by the second clutch C2, and selectively made stationary with respect to the case CS which serves as a non-rotary member by the second brake B2 or the one-way clutch OWC. The one-way clutch OWC selectively makes the carrier CA2 stationary with respect to the case CS by hindering only rotation in one direction. The ring gear R2 is drivably coupled so as to rotate together with the output shaft O. The second sun gear S3 is drivably coupled so as to selectively rotate together with the carrier CA1 of the first planetary gear mechanism PG1 by the third clutch C3, and selectively made stationary with respect to the case CS by the first brake B1.

In the embodiment, the plurality of engagement devices C1, C2, C3, B1, and B2 of the speed change device TM, excluding the one-way clutch OWC, are each a friction engagement device. Specifically, the clutches and the brakes are multi-plate clutches and multi-plate brakes that are actuated by a hydraulic pressure. The state of engagement of the engagement devices C1, C2, C3, B1, and B2 is controlled by a hydraulic pressure supplied from a hydraulic control device PC. The first engagement device SSC is also a friction engagement device.

A friction engagement device transfers torque between engagement members of the friction engagement device through friction between the engagement members. In the case where there is a difference in rotational speed (slipping) between the engagement members of a friction engagement device, torque (slip torque) corresponding to the magnitude of the transfer torque capacity is transferred from a member with a higher rotational speed to a member with a lower rotational speed through dynamic friction. In the case where there is no difference in rotational speed (slipping) between the engagement members of a friction engagement device, torque up to the magnitude of the transfer torque capacity is transferred between the engagement members of the friction engagement device through static friction. Here, the term "transfer torque capacity" refers to the magnitude of maximum torque that can be transferred by a friction engagement device through friction. The magnitude of the transfer torque capacity is varied in proportion to the engagement pressure for the friction engagement device. The term "engagement pressure" refers to a pressure (or a force) that presses an input-side engagement member (friction plate) and an output-side engagement member (friction plate) against each other. In the embodiment, the engagement pressure is varied in proportion to the magnitude of the supplied hydraulic pressure. That is, in the embodiment, the magnitude of the transfer torque capacity is varied in proportion to the magnitude of the hydraulic pressure which is supplied to the friction engagement device.

Each of the friction engagement devices includes a return spring, and is urged to be disengaged by the reaction force of the spring. When a force generated by the hydraulic pressure which is supplied to a hydraulic cylinder of the friction engagement device exceeds the reaction force of the spring, the friction engagement device starts generating a transfer torque capacity to bring the friction engagement device from the disengaged state into the engaged state. The hydraulic pressure at which the transfer torque capacity starts being generated is referred to as a "stroke end pressure". Each of the friction engagement devices is configured such that the transfer torque capacity of the friction engagement device is increased in proportion to an increase in supplied hydraulic pressure after the hydraulic pressure exceeds the stroke end pressure. The friction engagement devices may not be provided with a return spring, and may be structured to be controlled in accordance with a difference between hydraulic pressures applied to both sides of a piston of the hydraulic cylinder.

In the embodiment, the term "engaged state" refers to a state in which an engagement device is generating a transfer torque capacity. The engaged state includes a slipping engagement state and a direct engagement state. The term "disengaged state" refers to a state in which an engagement device is not generating a transfer torque capacity. The term "slipping engagement state" refers to an engagement state in which there is a difference in rotational speed (slipping) between the engagement members of an engagement device. The term "direct engagement state" refers to an engagement state in which there is no difference in rotational speed (slipping) between the engagement members of an engagement device. The term "non-direct engagement state" refers to an engagement state other than the direct engagement state, and includes the disengaged state and the slipping engagement state.

In the friction engagement devices, a transfer torque capacity is occasionally generated by dragging between the engagement members (friction members) even in the case where the control device 30 is not providing a command to produce a transfer torque capacity. For example, a transfer torque capacity may be generated by dragging between the friction members which contact each other even in the case where the friction members are not pressed against each other by the piston. Thus, the term "disengaged state" also includes a state in which a transfer torque capacity is generated by dragging between the friction members in the case where the control device 30 is not providing a friction engagement device with a command to produce a transfer torque capacity.

1-2. Configuration of Hydraulic Control System

The hydraulic control system of the vehicle drive transfer device 1 includes the hydraulic control device PC which adjusts the hydraulic pressure of working oil supplied from a hydraulic pump driven by the drive force source 3 for the vehicle or a dedicated motor to a predetermined pressure. The hydraulic control device PC includes hydraulic control valves such as a plurality of linear solenoid valves that adjust a hydraulic pressure to be supplied to the engagement devices C1, B1, . . . , SSC, and so forth. The hydraulic control valves have the operation amount of the valves adjusted in accordance with a signal value of a hydraulic pressure command supplied from the control device 30 to supply working oil at a hydraulic pressure that matches the signal value to each of the engagement devices C1, B1, . . . , SSC, and so forth. The signal value which is supplied from the control device 30 to the linear solenoid valves is a current value. The hydraulic pressure which is output from the linear solenoid valves is basically proportional to the current value which is supplied from the control device 30.

The hydraulic control device PC adjusts the degree of opening of one or two or more adjustment valves on the basis of a hydraulic pressure (signal pressure) output from a linear solenoid valve for hydraulic pressure adjustment, thereby adjusting the amount of the working oil drained from the adjustment valves to adjust the hydraulic pressure of the working oil to one or two or more predetermined pressures. After being adjusted to the predetermined pressures, the working oil is supplied to the plurality of engagement devices C1, B1, . . . , the first engagement device SSC, and so forth of the speed change device TM at a hydraulic pressure required by each of the engagement elements.

1-3. Configuration of Control Device

Next, the configuration of the control device 30 which controls the vehicle drive transfer device 1 and the internal combustion engine control device 31 will be described with reference to FIG. 2. The control units 32 to 34 of the control device 30 and the internal combustion engine control device 31 each include an arithmetic processing unit such as a CPU that serves as a core member, a storage device such as a RAM (random access memory) configured to read and write data from and into the arithmetic processing unit and a ROM (read only memory) configured to read data from the arithmetic processing unit, and so forth. Functional sections 41 to 45 of the control device 30 etc. are formed by software (a program) stored in the ROM of the control device or the like, hardware such as a separately provided arithmetic circuit, or a combination of both. The control units 32 to 34 of the control device 30 and the internal combustion engine control device 31 are configured to communicate with each other, and perform cooperative control while sharing various information such as information detected by sensors and control parameters, thereby implementing the functions of the functional sections 41 to 45.

The vehicle drive transfer device 1 includes sensors such as sensors Se1 to Se5, and an electrical signal output from each sensor is input to the control device 30 and the internal combustion engine control device 31. The control device 30 and the internal combustion engine control device 31 calculate information detected by the sensors on the basis of the input electrical signals.

An input rotational speed sensor Se1 is a sensor that detects the rotational speed of the input shaft I. The rotor Ro of the rotary electric machine MG is integrally drivably coupled to the input shaft I. Thus, the control device 30 detects the rotational speed (angular speed) of the rotary electric machine MG and the rotational speed of the input shaft I on the basis of a signal input from the input rotational speed sensor Se1. An output rotational speed sensor Se2 is a sensor that detects the rotational speed of the output shaft O. The control device 30 detects the rotational speed (angular speed) of the output shaft O on the basis of a signal input from the output rotational speed sensor Se2. The rotational speed of the output shaft O is proportional to the vehicle speed. Therefore, the control device 30 calculates the vehicle speed on the basis of a signal input from the output rotational speed sensor Se2. An engine rotational speed sensor Se3 is a sensor that detects the rotational speed of the engine output shaft Eo (internal combustion engine ENG). The internal combustion engine control device 31 detects the rotational speed (angular speed) of the internal combustion engine ENG on the basis of a signal input from the engine rotational speed sensor Se3.

A shift position sensor Se4 is a sensor that detects the selected position (shift position) of a shift lever operated by a driver. The control device 30 detects the shift position on the basis of a signal input from the shift position sensor Se4. The shift lever is operable to select a parking range (P range), a reverse travel range (R range), a neutral range (N range), a forward travel range (D range), and so forth. The shift lever is also operable to select a shift speed restriction range as a type of the D range, such as "2 range" and "L range", in which the range of forward shift speeds to be established is restricted. The shift lever is also configured to enable an operation of an "upshift request switch" that is used to request the speed change device TM to perform an upshift and a "downshift request switch" that is used to request the speed change device TM to perform a downshift when the D range is selected. An accelerator operation amount sensor Se5 is a sensor that detects the operation amount of an accelerator pedal. The control device 30 detects the accelerator operation amount on the basis of a signal input from the acceleration operation amount sensor Se5.

1-3-1. Vehicle Control Unit 34

The vehicle control unit 34 includes an integration control section 45. The integration control section 45 controls integration of various torque control performed on the internal combustion engine ENG, the rotary electric machine MG, the speed change device TM, the first engagement device SSC, and so forth, engagement control for the engagement devices, and so forth over the entire vehicle. The integration control section 45 calculates wheel required torque, which is torque required to be transferred to the wheels W, and decides the drive mode of the internal combustion engine ENG and the rotary electric machine MG, in accordance with the accelerator operation amount, the vehicle speed, the charge amount of the battery, and so forth. Here, the wheel required torque is torque required to be transferred to the wheels via the vehicle drive transfer device 1 in order to drive the wheels W, and is decided on the basis of an operation by the driver of the accelerator operation amount of the vehicle or the like. Besides that, the wheel required torque may also be decided on the basis of a command from the vehicle side, e.g. a command from a vehicle motion control section such as an attitude control device of the vehicle. In the embodiment, the wheel required torque matches post-shifting output torque which is output torque corresponding to post-shifting input torque which is torque input after the end of shifting. In the embodiment, in addition, the control device 30 has, as drive modes, an electric mode in which the vehicle travels using only the rotary electric machine MG as the drive force source 3 and a parallel mode in which the vehicle travels using at least the internal combustion engine ENG as the drive force source 3. For example, the electric mode is decided as the drive mode in the case where the accelerator operation amount is small and the charge amount of the battery is large, and the parallel mode is decided as the drive mode in the other cases, that is, in the case where the accelerator operation amount is large or the charge amount of the battery is small.

The integration control section 45 calculates internal combustion engine required torque which is output torque required for the internal combustion engine ENG, rotary electric machine required torque which is output torque required for the rotary electric machine MG, a hydraulic pressure command which is a target for a hydraulic pressure to be supplied to the first engagement device SSC, and a hydraulic pressure command which is a target for a hydraulic pressure to be supplied to the engagement devices C1, B1, . . . of the speed change device TM on the basis of the wheel required torque, the drive mode, the charge amount of the battery, and so forth, and provides the calculated values to the other control units 32 and 33 and the internal combustion engine control device 31 to perform integration control. Basically, the total of the internal combustion engine required torque and the rotary electric machine required torque is set so as to coincide with the wheel required torque.

1-3-2. Internal Combustion Engine Control Device 31

The internal combustion engine control device 31 includes an internal combustion engine control section 41 that controls operation of the internal combustion engine ENG. In the embodiment, in the case where a command for the internal combustion engine required torque is provided from the integration control section 45 or the speed change control section 43, the internal combustion engine control section 41 performs torque control in which the internal combustion engine ENG is controlled so as to output the internal combustion engine required torque.

1-3-3. Rotary Electric Machine Control Unit 32

The rotary electric machine control unit 32 includes a rotary electric machine control section 42 that controls operation of the rotary electric machine MG. In the embodiment, in the case where a command for the rotary electric machine required torque is provided from the integration control section 45 or the speed change control section 43, the rotary electric machine control section 42 performs control such that the rotary electric machine MG outputs the rotary electric machine required torque. Specifically, the rotary electric machine control section 42 controls the output torque from the rotary electric machine MG by performing control so as to turn on and off a plurality of switching elements provided in the inverter.

1-3-4. Power Transfer Control Unit 33

The power transfer control unit 33 includes the speed change control section 43 which controls the speed change device TM and a first engagement control section 44 that controls the first engagement device SSC.

1-3-5. First Engagement Control Section 44

The first engagement control section 44 controls the engagement state of the first engagement device SSC. In the embodiment, the first engagement control section 44 controls a signal value to be supplied to the linear solenoid valves provided in the hydraulic control device PC such that the hydraulic pressure to be supplied to the first engagement device SSC coincides with a hydraulic pressure command for the first engagement device SSC provided from the integration control section 45 or the speed change control section 43.

1-3-6. Speed Change Control Section 43

The speed change control section 43 performs speed change control in which the shift speed to be established in the speed change device TM is switched by controlling engagement and disengagement of the plurality of engagement devices C1, B1, . . . . In the embodiment, the speed change control section 43 decides a target shift speed to be established in the speed change device TM on the basis of information detected by the sensors such as the vehicle speed, the accelerator operation amount, and the shift position. The speed change control section 43 controls the hydraulic pressure to be supplied to the plurality of engagement devices C1, B1, . . . which are provided in the speed change device TM via the hydraulic control device PC to engage or disengage the engagement devices C1, B1, . . . in order to establish the target shift speed in the speed change device TM. Specifically, the speed change control section 43 transfers a hydraulic pressure command (target hydraulic pressure) for the engagement devices to the hydraulic control device PC, and the hydraulic control device PC supplies the engagement devices with a hydraulic pressure that matches the transferred hydraulic pressure command. In the embodiment, the speed change control section 43 is configured to control a hydraulic pressure to be supplied to the engagement devices by controlling a signal value to be supplied to the linear solenoid valves which are provided in the hydraulic control device PC.

In the embodiment, the speed change control section 43 references a speed change map stored in a memory (not illustrated) to decide the target shift speed. The speed change map is a map that defines the relationship between the accelerator operation amount and the vehicle speed and the target shift speed for the speed change device TM. The speed change map includes a plurality of upshift lines and a plurality of downshift lines. When the vehicle speed and the accelerator operation amount are varied so that an upshift line or a downshift line is crossed on the speed change map, the speed change control section 43 decides a new target shift speed for the speed change device TM, and determines to change the shift speed. In addition, the speed change control section 43 may change the target shift speed in the case where an upshift request or a downshift request is provided when the selected position (shift position) of the shift lever is changed by the driver. The term "downshift" means a change from a shift speed with a lower speed ratio to a shift speed with a higher speed ratio. The term "upshift" means a change from a shift speed with a higher speed ratio to a shift speed with a lower speed ratio.

In the case where speed change control in which the shift speed is switched is to be performed, the speed change control section 43 controls the hydraulic pressure command for the engagement devices C1, B1, . . . to engage and disengage the engagement devices C1, B1, . . . in order to switch the shift speed to be established in the speed change device TM to the target shift speed. In this event, the speed change control section 43 sets a disengagement-side engagement device which is an engagement device to be disengaged for shifting and an engagement-side engagement device which is an engagement device to be engaged for shifting. The speed change control section 43 performs so-called relay shifting in which the disengagement-side engagement device is disengaged and the engagement-side engagement device is engaged in accordance with a sequence of the speed change control planned in advance.

Specifically, the speed change control section 43 sets, as the disengagement-side engagement device, an engagement device that is one of the plurality of engagement devices which have been engaged in order to establish a shift speed before shifting and that is not one of the plurality of engagement devices to be engaged in order to establish a shift speed after shifting. The speed change control section 43 sets, as the engagement-side engagement device, an engagement device that is one of the plurality of engagement devices to be engaged in order to establish a shift speed after shifting and that is not one of the plurality of engagement devices which have been engaged in order to establish a shift speed before shifting. For example, in the case where the shift speed before shifting is the second speed 2nd and the shift speed after shifting is the third speed 3rd, the first brake B1 is set as the disengagement-side engagement device and the third clutch C3 is set as the engagement-side engagement device as illustrated in FIG. 4. In addition, the engagement-side engagement device is an engagement device that has been disengaged before the start of the speed change control and that is engaged through the speed change control. The disengagement-side engagement device is an engagement device that has been engaged before the start of the speed change control and that is disengaged through the speed change control.

During the speed change control, the speed change control section 43 calculates the internal combustion engine required torque which is required for the internal combustion engine ENG, the rotary electric machine required torque which is required for the rotary electric machine MG, and a hydraulic pressure command which is a target for a hydraulic pressure to be supplied to the engagement devices C1, B1, . . . of the speed change device TM in place of the integration control section 45, and provides the calculated values to the other control units 32 and 33 and the internal combustion engine control device 31 to perform integration control.

1-3-7. Specific Engagement Pressure Control

As described above, the speed change control section 43 has the engagement-side control section 46, the disengagement-side control section 47, and the input torque change section 48. The engagement-side control section 46 controls the engagement pressure for an engagement-side engagement device which is an engagement device that is engaged to perform shifting in which switching is made to a shift speed with a different speed ratio. The disengagement-side control section 47 controls the engagement pressure for a disengagement-side engagement device which is an engagement device that is disengaged to perform shifting. The input torque change section 48 changes input torque transferred from the drive force source 3 side to the input shaft I of the speed change device during shifting. When the distribution of torque transfer between the engagement-side engagement device and the disengagement-side engagement device is varied by the engagement-side control section 46 and the disengagement-side control section 47 by controlling the engagement pressures for the engagement-side engagement device and the disengagement-side engagement device during shifting, the engagement-side control section 46 performs specific engagement pressure control in which the engagement pressure for the engagement-side engagement device is varied at a constant variation rate or a variation rate that is higher than the constant variation rate at the time of the start of the variation (see FIG. 6). In the embodiment, the engagement-side control section 46 performs, in the specific engagement pressure control, front-loaded engagement pressure variation control in which the engagement pressure for the engagement-side engagement device is varied to an engagement pressure at which torque corresponding to the torque which is input after the end of shifting can be transferred to the wheel W side. In the following description, the engagement-side control section 46, the disengagement-side control section 47, and the input torque change section 48 may be described collectively as the speed change control section 43.

As described above, the engagement pressure for an engagement device is a pressure (or a force) that pushes the input-side engagement member and the output-side engagement member against each other, and the magnitude of the transfer torque capacity of an engagement device is varied in proportion to the engagement pressure. In the embodiment, the engagement pressure (transfer torque capacity) for an engagement device is varied in proportion to the magnitude of a hydraulic pressure supplied to the engagement device.

In the embodiment, the speed change control section 43 is configured to vary the distribution of torque transfer between the engagement-side engagement device and the disengagement-side engagement device by performing control (hereinafter referred to as "torque phase control") in which the engagement pressure for the engagement-side engagement device is increased and the engagement pressure for the disengagement-side engagement device is decreased. That is, in the torque phase control, transfer torque transferred through the engagement-side engagement device is increased when the engagement pressure for the engagement-side engagement device is increased, and transfer torque transferred through the disengagement-side engagement device is decreased when the engagement pressure for the disengagement-side engagement device is decreased, so that the distribution of torque transfer between the engagement-side engagement device and the disengagement-side engagement device is varied.

In addition, the speed change control section 43 is configured to vary rotation of the input shaft I by performing control (hereinafter referred to as "inertia phase control") in which rotation is varied so as to increase a rotational speed difference $\Delta W1$ between the engagement members of the disengagement-side engagement device and decrease a rotational speed difference $\Delta W2$ between the engagement members of the engagement-side engagement device. In the embodiment, the speed change control section 43 is configured to perform shifting (input torque change control and specific engagement pressure control) using the engagement-side control section 46, the disengagement-side control section 47, and the input torque change section 48 in the case where a power-on upshift which is shifting in which switching is made to a shift speed with a lower speed ratio is performed with the wheel required torque constant or increasing. That is, in the case where a power-on upshift is performed, the input torque change section 48 changes the input torque in the direction of increasing the input torque, and the engagement-side control section 46 performs the specific engagement pressure control. Through the specific engagement pressure control, it is possible to perform smooth shifting by suppressing fluctuations in output torque. Thus, in general, the specific engagement pressure control is preferably executed in the electric mode (a mode in which the vehicle travels using only the rotary electric machine MG as the drive force source 3) in which the driver of the vehicle is considered to desire smooth travel with little vibration or shock.

Variations in distribution of torque transfer are started before variations in rotation of the input shaft I are caused. That is, the speed change control section 43 is configured to cause variations in rotation of the input shaft I (perform inertia phase control) after variations in distribution of torque transfer (torque phase control) are started.

When the torque phase control is performed, the relationship of torque transfer is caused to transition from a state with the shift speed before shifting to a state with the shift speed after shifting. That is, torque obtained by multiplying the input torque by the speed ratio (gear ratio) of the shift speed before shifting is transferred to the output shaft O before execution of the torque phase control, and torque obtained by multiplying the input torque by the speed ratio (gear ratio) of the shift speed after shifting is transferred to the output shaft O after execution of the torque phase control. Therefore, in the case of an upshift in which the speed ratio is decreased, torque to be transferred to the output shaft O is decreased with respect to the same input torque transferred to the input shaft I when the torque phase control is performed. During the torque phase control, the relationship of torque transfer gradually transitions from a state with the shift speed before shifting to a state with the shift speed after shifting as the engagement pressure for the engagement-side engagement device is increased and the engagement pressure for the disengagement-side engagement device is lowered. Such variations in speed ratio (gear ratio) in the torque phase control are also referred to as "variations in torque conversion ratio".

When the torque phase control is performed, the disengagement-side engagement device is brought into the disengaged state, and the engagement-side engagement device is brought into the slipping engagement state. Therefore, transfer torque transferred from the input shaft I to the output shaft O side via the engagement-side engagement device in the slipping engagement state, of the input torque which is transferred from the drive force source 3 to the input shaft I, is torque that matches the transfer torque capacity of the engagement-side engagement device in the slipping engagement state. Therefore, when the torque phase control is performed, torque transferred to the output shaft O is varied in accordance with the engagement pressure for the engagement-side engagement device. While the disengagement-side engagement device remains in the direct engagement state during the torque phase control, torque obtained by excluding torque transferred via the engagement-side engagement device from the input torque is transferred from the input shaft I to the output shaft O side via the disengagement-side engagement device.

When the inertia phase control is performed, the relationship of the rotational speed is also caused to transition from a state with the shift speed before shifting to a state with the shift speed after shifting. That is, the rotational speed of the output shaft O is a rotational speed obtained by dividing the rotational speed of the input shaft I by the speed ratio (gear ratio) of the shift speed before shifting before execution of the inertia phase control, and the rotational speed of the output shaft O is a rotational speed obtained by dividing the rotational speed of the input shaft I by the speed ratio (gear ratio) of the shift speed after shifting after execution of the inertia phase control. Therefore, in the case of an upshift in which the speed ratio is decreased, the rotational speed of the input shaft I is decreased with respect to the same rotational speed of the output shaft O when the inertia phase control is performed. During the inertia phase control, the relationship of the rotational speed gradually transitions from a state with the shift speed before shifting to a state with the shift speed after shifting as the rotational speed difference ΔW1 for the disengagement-side engagement device is increased and the rotational speed difference ΔW2 for the engagement-side engagement device is decreased.

The speed change control section 43 (input torque change section 48) changes input torque transferred from the drive force source 3 side to the input shaft I of the speed change device TM during shifting. Hereinafter, the change in input torque is referred to as "input torque change control". The speed change control section 43 performs the specific engagement pressure control in which the engagement pressure for the engagement-side engagement device is varied at a constant variation rate or a variation rate that is higher than the constant variation rate at the time of the start of the variation (see FIG. 6) when the distribution of torque transfer is varied (in the torque phase control). In the embodiment, further, the engagement-side control section 46 performs, in the specific engagement pressure control, the front-loaded engagement pressure variation control in which the engagement pressure for the engagement-side engagement device is varied (in the example, increased) to an engagement pressure (hereinafter also referred to as a "variation engagement pressure") at which torque corresponding to the torque which is input after the end of shifting (hereinafter also referred to as "post-shifting input torque") can be transferred to the wheel W side.

In the embodiment, the speed change control section 43 is configured to vary (in the example, increase) a command value (in the example, a hydraulic pressure command) for varying the engagement pressure for the engagement-side engagement device at an advanced phase with respect to the changes in input torque due to the input torque change control (input torque change section 48) in the specific engagement pressure control (front-loaded engagement pressure variation control). In the embodiment, the speed change control section 43 is configured to perform shifting (input torque change control and specific engagement pressure control) using the engagement-side control section 46, the disengagement-side control section 47, and the input torque change section 48 in the case where a power-on upshift is performed, and the input torque change section 48 is configured to change the input torque in the direction of increasing the input torque in the input torque change control. The changes in input torque by the input torque change section 48 may be made by changing the output torque from both the internal combustion engine ENG and the rotary electric machine MG which serve as the drive force source 3. However, the changes in input torque may be made by changing the output torque from only one of the internal combustion engine ENG and the rotary electric machine MG. For example, the changes in input torque by the input torque change section 48 are preferably made by changing the output torque from the rotary electric machine MG which is more responsive than the internal combustion engine ENG.

In the embodiment, the speed change control section 43 is configured to change the input torque such that variations in output torque transferred from the speed change device TM to the wheels W via the output shaft O due to variations in speed ratio due to shifting are decreased. For example, in the case of an upshift, the speed ratio is decreased by shifting, and therefore the output torque is decreased unless the input torque is increased. Therefore, in the case of an upshift, the speed change control section 43 increases the input torque during shifting so that fluctuations in output torque are decreased. In the case of a downshift, on the other hand, the speed ratio is increased by shifting, and therefore the output torque is increased unless the input torque is decreased. Therefore, in the case of a downshift, the speed change control section 43 decreases the input torque during shifting so that fluctuations in output torque are decreased. In the embodiment, the speed change control section 43 is configured to increase or decrease the input torque during shifting such that the output torque is not fluctuated before and after shifting. The speed change control section 43 changes the input torque during shifting such that post-shifting input torque Tinaf is torque obtained by multiplying torque Tinbf input before the start of shifting (hereinafter also referred to as "pre-shifting input torque") by the ratio of a speed ratio Kbf before shifting to a speed ratio Kaf after shifting as indicated by the formula (1).

$$Tinaf = Tinbf \times Kbf / Kaf \tag{1}$$

When the engagement pressure for the disengagement-side engagement device is decreased and the engagement pressure for the engagement-side engagement device is increased in the torque phase control as described above, transfer torque transferred from the input shaft I to the output shaft O side via the engagement-side engagement device in the slipping engagement state, of the input torque which is transferred to the input shaft I, is torque that matches the transfer torque capacity of the engagement-side engagement device. When the front-loaded engagement pressure variation control is performed in the torque phase control, the output torque which is transferred from the input shaft I side to the output shaft O via the engagement-side engagement device in the slipping engagement state is increased to the post-shifting input torque corresponding to the torque which is input after the end of shifting, and thus the post-shifting input torque corresponding to the torque which is input after the end of shifting can be transferred to the output shaft O from a time during the torque phase control (during variations in distribution of torque transfer). Therefore, fluctuations in output torque during shifting can be suppressed.

If the input torque which is transferred from the drive force source 3 to the input shaft I remains the same even if the specific engagement pressure control (front-loaded engagement pressure variation control) is performed in the torque phase control, meanwhile, torque transferred from the input shaft I to the output shaft O side via the disengagement-side engagement device in the direct engagement state before being disengaged and the engagement-side engagement device in the slipping engagement state is fluctuated from the wheel required torque, which is torque required to be transferred to the wheels W, during a period before the engagement pressure for the engagement-side engagement device is increased to the variation engagement pressure.

Furthermore, the rotational speed of the input shaft I is fluctuated with the input torque which is transferred from the drive force source 3 to the input shaft I becoming insufficient or excessive with respect to torque transferred from the input shaft I to the output shaft O side via the engagement-side engagement device in the slipping engagement state and the disengagement-side engagement device in the direct engagement state. Here, the wheel required torque matches torque output after the end of shifting (post-shifting output torque) corresponding to the post-shifting input torque which is the torque which is input after the end of shifting.

Thus, the speed change control section 43 (input torque change section 48) is configured to change the input torque to the post-shifting input torque corresponding to the torque which is input after the end of shifting during the torque phase control (while the distribution of torque transfer is varied) in the input torque change control. With this configuration, fluctuations in output torque transferred to the output shaft O via the engagement-side engagement device in the slipping engagement state and the disengagement-side engagement device in the direct engagement state from the wheel required torque can be suppressed during a period before the engagement pressure for the engagement-side engagement device is increased to the variation engagement pressure in the torque phase control.

In the embodiment, the speed change control section 43 is configured to vary the input torque from the pre-shifting input torque to the post-shifting input torque gradually (in the example, at a constant variation speed) in a period for the torque phase control set in advance. Here, the speed change control section 43 sets the variation speed of the input torque to a value obtained by dividing the deviation between the post-shifting input torque and the pre-shifting input torque by the period for the torque phase control. The speed change control section 43 is configured to gradually vary the output torque from the drive force source 3 by gradually varying a command for the output torque from the drive force source 3 (in the example, internal combustion engine required torque, rotary electric machine required torque) to be transferred to the control section for the drive force source 3 (in the example, the internal combustion engine control section 41 and the rotary electric machine control section 42, or the integration control section 45 which performs integration control on the internal combustion engine control section 41 and the rotary electric machine control section 42) during the torque phase control.

Maximum torque that can be output is set for each of the internal combustion engine ENG and the rotary electric machine MG. An increase in input torque is restricted to the maximum torque of the drive force source 3. In the case of the internal combustion engine ENG, the maximum torque under various drive conditions is determined by the maximum amount of air that can be charged into combustion chambers, the maximum amount of fuel that can be supplied to the combustion chambers, or the like. In the case of the rotary electric machine MG, the maximum torque is determined in accordance with the rotational speed of the rotary electric machine MG or the charge amount of the battery. Therefore, even if it is attempted to increase the input torque in correspondence with a decrease in speed ratio due to shifting on the basis of the formula (1) above or the like, an increase in input torque may be restricted by the maximum torque of the drive force source 3. Thus, the speed change control section 43 is configured to receive information on the post-shifting input torque which can be actually output from the control section for the drive force source 3 (in the example, the internal combustion engine control section 41 and the rotary electric machine control section 42, or the integration control section 45 which performs integration control on the internal combustion engine control section 41 and the rotary electric machine control section 42). The speed change control section 43 is configured to change the input torque to the post-shifting input torque which can be actually output from the drive force source 3 which is received from the control section for the drive force source 3 during the torque phase control.

More particularly, the speed change control section 43 is configured to transfer, to the control section for the drive force source 3, target post-shifting input torque varied in accordance with variations in speed ratio due to shifting, e.g. on the basis of the formula (1) above, after the start of shifting. The control section for the drive force source 3 determines the post-shifting input torque which can be actually output from the drive force source 3 within the range of the target post-shifting input torque which is transferred from the speed change control section 43 on the basis of the maximum torque of the drive force source 3 (in the example, the maximum torque of the internal combustion engine ENG, the maximum torque of the rotary electric machine MG), and transfers the determined post-shifting input torque to the speed change control section 43. In the case where the target post-shifting input torque is within the range of the maximum torque of the drive force source 3, the control section for the drive force source 3 transfers the target post-shifting input torque as it is to the speed change control section 43 as the post-shifting input torque which can be actually output from the drive force source 3. In the case where the target post-shifting input torque is out of the range of the maximum torque of the internal combustion engine ENG, on the other hand, the control section for the drive force source 3 transfers the maximum torque of the drive force source 3 to the speed change control section 43 as the post-shifting input torque which can be actually output from the drive force source 3.

The internal combustion engine control section 41 calculates the maximum torque of the internal combustion engine ENG on the basis of drive conditions such as the rotational speed of the internal combustion engine ENG using the output characteristics of the internal combustion engine ENG. The rotary electric machine control section 42 calculates the maximum torque of the rotary electric machine MG on the basis of drive conditions such as the rotational speed of the rotary electric machine MG and the charge amount of the battery using the output characteristics of the rotary electric machine MG. The speed change control section 43 is configured to vary the input torque gradually (in the example, at a constant variation speed) to the post-shifting input torque which can be actually output from the drive force source 3 during the torque phase control in the input torque change control. In this way, the speed change control section 43 receives, from the control section for the drive force source 3, information on the post-shifting input torque which can be actually output from the drive force source 3. Thus, it is not necessary for the speed change control section 43 to store data such as an output characteristic map for the internal combustion engine ENG or the rotary electric machine MG and calculate the maximum torque of the internal combustion engine ENG or the rotary electric machine MG. Therefore, an increase in processing load or storage capacity of the speed change control section 43 can be suppressed. In addition, it is not necessary to change the output characteristics of the internal combustion engine ENG or the rotary electric machine MG which are stored in the speed change control section 43 each time the type of the internal combustion engine ENG or the rotary electric machine MG is changed, which reduces the manufacturing cost.

As described above, the speed change control section 43 varies the engagement pressure for the engagement-side engagement device at a constant variation rate or a variation rate that is higher than the constant variation rate at the time of the start of the variation (see FIG. 6) in the torque phase control. The engagement pressure for the engagement-side engagement device is increased to the variation engagement pressure at which the post-shifting input torque corresponding to the torque which is input after the end of shifting can be transferred to the wheel W side. In the embodiment, the speed change control section 43 sets the variation engagement pressure to an engagement pressure (hydraulic pressure) at which the post-shifting input torque can be transferred to the output shaft O. Specifically, the speed change control section 43 calculates the transfer torque capacity of the engagement-side engagement device by multiplying the post-shifting input torque by the tooth number ratio of a gear that acts on the engagement-side engagement device, and calculates a hydraulic pressure command that achieves the calculated transfer torque capacity.

The speed change control section 43 is configured to vary (in the example, increase) a command value (in the example, a hydraulic pressure command) for varying the engagement pressure for the engagement-side engagement device at an advanced phase with respect to the changes in input torque so that the actual engagement pressure for the engagement-side engagement device is increased in phase with the changes in input torque. In the embodiment, the speed change control section 43 is configured to gradually increase the hydraulic pressure command for the engagement-side engagement device to the variation engagement pressure in an engagement pressure variation period set in advance to be shorter than an input torque variation period in which the input torque is varied to the post-shifting input torque after the start of the torque phase control. In the example, the input torque variation period is set to the same period as the period of the torque phase control. The engagement pressure variation period is set after being adapted in advance through an experiment or the like such that the phase of the changes in input torque and the phase of the variations in actual engagement pressure for the engagement-side engagement device match each other. The engagement pressure variation period may be set by multiplying the input torque variation period by a coefficient set in advance to a value that is smaller than one. Here, in the case where the engagement pressure (hydraulic pressure) for the engagement-side engagement device is varied at a constant variation rate in the specific engagement pressure control, the variation rate is preferably set to a value obtained by dividing the deviation between the engagement pressure (hydraulic pressure) for the engagement-side engagement device after the torque phase control and the engagement pressure (hydraulic pressure) for the engagement-side engagement device before the torque phase control by the engagement pressure variation period. In the embodiment, the thus set variation rate is defined as a reference variation rate, and the engagement-side control section 46 varies the engagement pressure for the engagement-side engagement device at the reference variation rate which is constant in the specific engagement pressure control. In addition, the constant variation rate is set similarly also in the case where the engagement pressure (hydraulic pressure) for the engagement-side engagement device is varied at a variation rate that is higher than the constant variation rate at the time of the start of the variation in the specific engagement pressure control. In this case, in the embodiment, the engagement-side control section 46 varies the engagement pressure for the engagement-side engagement device at a variation rate that is higher than the reference variation rate at the time of the start of the variation in the specific engagement pressure control.

<Timing Chart According to Comparative Example>

Figure 5:
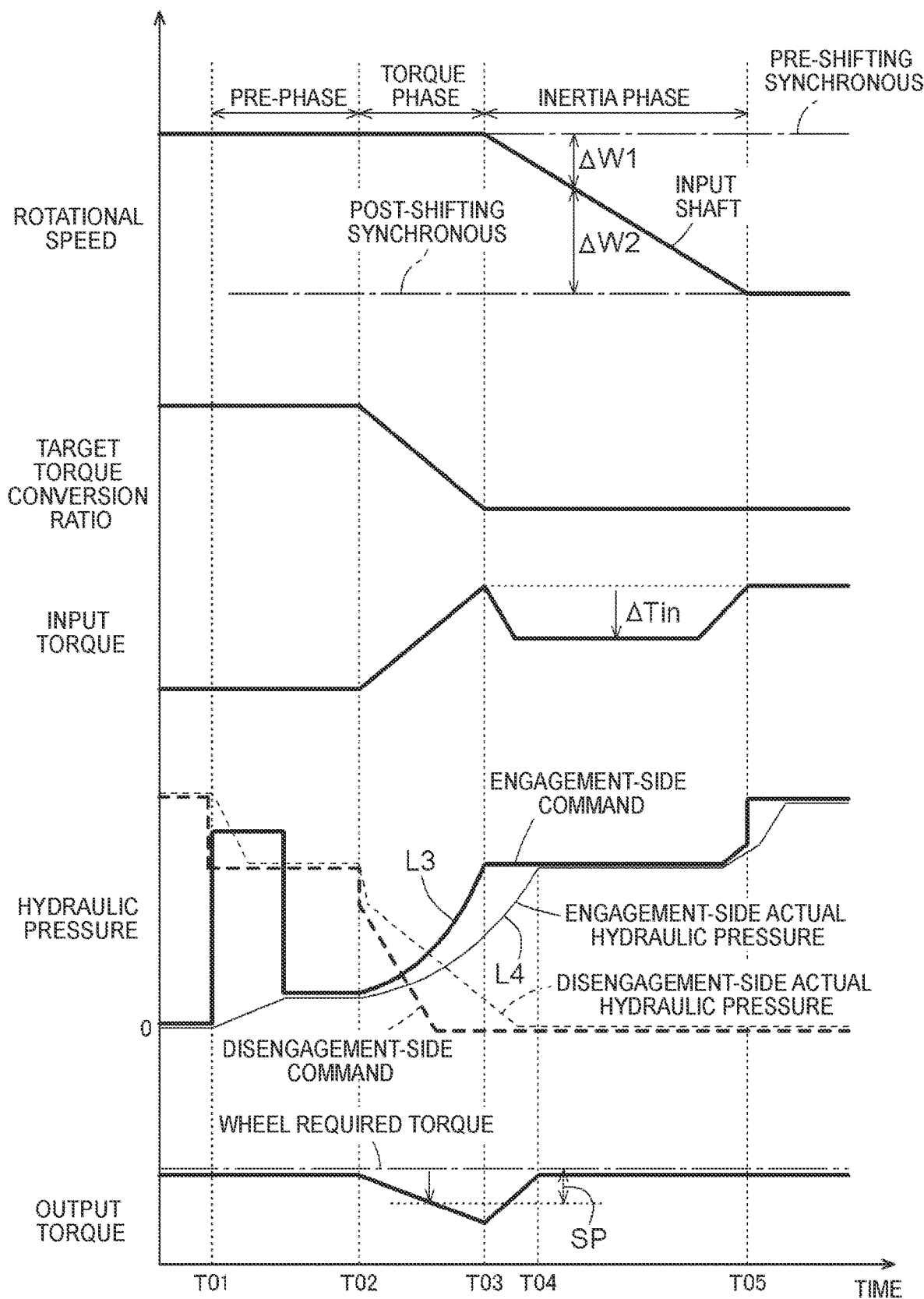
FIG. 5 is a timing chart according to a comparative example of the first embodiment.

FIG. 5 illustrates a timing chart according to a comparative example. In the example of FIG. 5, unlike the embodiment, the hydraulic pressure command for the engagement-side engagement device is increased at a delayed phase with respect to the changes in input torque (from time T02 to time T03). This is due to the fact that the hydraulic pressure command is controlled so as to follow the variations in input torque. Therefore, the hydraulic pressure command for the engagement-side engagement device is varied along a variation line L3 in an arcuate shape (in a downwardly convex arcuate shape) with a lower variation rate at the time of the start of the variation than a line with a constant variation rate. Correspondingly, the actual engagement pressure for the engagement-side engagement device is also increased at a delayed phase with respect to the increase in input torque, and varied along a variation line L4 in an arcuate shape (in a downwardly convex arcuate shape) with a lower variation rate at the time of the start of the variation than a line with a constant variation rate. Torque transferred from the input shaft I to the output shaft O side via the engagement-side engagement device in the slipping engagement state is insufficient with respect to the increased input torque by an amount corresponding to such a delay, and the output torque which is transferred to the output shaft O is lowered with respect to the wheel required torque (from time T02 to time T04). Therefore, the drop in output torque with respect to the wheel required torque is larger than a set amount SP during a torque phase. Thus, the driver may feel relatively large torque fluctuations. If the output torque deviates from the wheel required torque to cause a drop in torque, such torque fluctuations may give the driver a sense of discomfort. Thus, the set amount SP is preferably a value set in advance in accordance with the magnitude of tolerable fluctuations in output torque. The set amount SP is preferably set in advance in accordance with the specifications, the performance, or the like of the vehicle.

<Timing Chart According to Embodiment>

Figure 6:
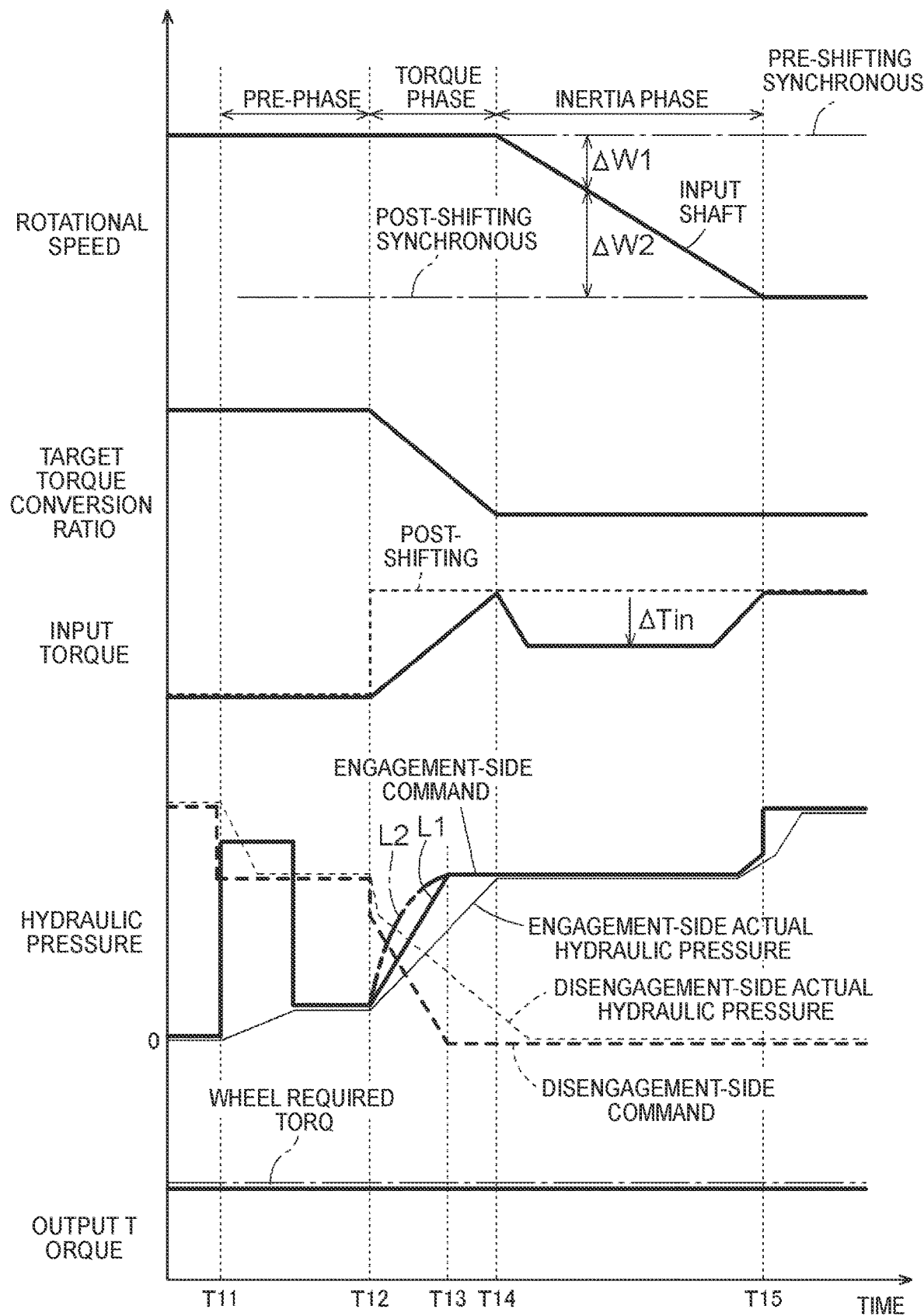
FIG. 6 is a timing chart according to the first embodiment.

FIG. 6 illustrates a timing chart of the embodiment. In the embodiment, as described above, the speed change control section 43 increases a hydraulic pressure command for the engagement-side engagement device at an advanced phase with respect to the changes in input torque so that the actual engagement pressure for the engagement-side engagement device is increased in phase with the changes in input torque during the torque phase control (from time T12 to time T13). Therefore, the phase of the increase in input torque and the phase of the increase in actual engagement pressure for the engagement-side engagement device are caused to match each other. With the phases caused to match each other, the insufficiency of torque transferred from the input shaft I to the output shaft O side via the engagement-side engagement device in the slipping engagement state with respect to the increased input torque is suppressed. Consequently, the reduction in output torque transferred to the output shaft O with respect to the wheel required torque is suppressed (from time T12 to time T13), which can prevent the driver from feeling torque fluctuations.

Next, shifting will be described in detail with reference to the exemplary timing chart illustrated in FIG. 6. The example illustrated in FIG. 6 corresponds to a case where shifting is performed in a power-on upshift. The speed change control section 43 determines that an upshift is started because the target shift speed is changed to a shift speed with a lower speed ratio at time T11 with the wheel required torque constant or increased. The target shift speed is changed in the case where an upshift line is crossed because of an increase in vehicle speed, in the case where the shift position is changed, or the like, for example.

<Pre-Phase Control>

The speed change control section 43 varies the engagement pressures for the disengagement-side engagement device and the engagement-side engagement device in advance by performing pre-phase control in a period from time T11 to time T12.

The speed change control section 43 lowers the hydraulic pressure command for the disengagement-side engagement device from a complete engagement pressure to a disengagement-side reference pressure and increases the hydraulic pressure command for the engagement-side engagement device to a stroke end pressure in a period from time T11 to time T12. Here, the complete engagement pressure is a maximum engagement pressure (supply hydraulic pressure, hydraulic pressure command) set in order to maintain an engaged state without slipping even if torque transferred from the drive force source to the engagement device is fluctuated. In order to speed up the rise in supply hydraulic pressure for the engagement-side engagement device, the hydraulic pressure command for the engagement-side engagement device is temporarily increased stepwise. The disengagement-side reference pressure is set to an engagement pressure (hydraulic pressure) at which the disengagement-side engagement device can transfer the pre-shifting input torque to the output shaft O side.

<Torque Phase>

After execution of the pre-phase control, the speed change control section 43 performs torque phase control in a period for the torque phase control from time T12 to time T14.

After the start of the torque phase control, the speed change control section 43 receives, from the control section for the drive force source 3, information on the post-shifting input torque which can be actually output from the drive force source 3 (time T12). In a period for the torque phase control (from time T12 to time T14), the speed change control section 43 increases the input torque from the pre-shifting input torque to the post-shifting input torque at a constant variation rate (variation speed). In the example illustrated in FIG. 6, the post-shifting input torque is set to such torque that does not fluctuate the output torque before and after shifting because of variations in speed ratio before and after shifting on the basis of the formula (1) above. In addition, the post-shifting input torque is set to torque that can be actually output from the drive force source 3. In the embodiment, the speed change control section 43 is configured to vary the target torque conversion ratio (speed ratio) from a torque conversion ratio (speed ratio) before shifting to a torque conversion ratio (speed ratio) after shifting at a constant variation rate in a period for the torque phase control (from time T12 to time T14). The speed change control section 43 is configured to gradually vary the output torque from the drive force source 3 by gradually varying a command for the output torque from the drive force source 3 which is transferred to the control section for the drive force source 3 in accordance with variations in target torque conversion ratio.

After the start of the torque phase control, the speed change control section 43 varies the engagement pressure (hydraulic pressure) for the engagement-side engagement device at a constant variation rate. In the embodiment, the speed change control section 43 increases the hydraulic pressure command for the engagement-side engagement device from the stroke end pressure to the variation engagement pressure at which the post-shifting input torque can be transferred at a constant variation rate (variation speed) in an engagement pressure variation period (from time T12 to time T13) set in advance to a shorter period than the input torque variation period (from time T12 to time T14). In the embodiment, this variation rate is used as the reference variation rate. In the example, the speed change control section 43 varies the engagement pressure (hydraulic pressure) for the engagement-side engagement device along a variation line L1 with the reference variation rate which is constant. Consequently, the hydraulic pressure command for the engagement-side engagement device can be increased at an advanced phase with respect to the increase in input torque, and the phase of the increase in input torque and the phase of the increase in actual engagement pressure for the engagement-side engagement device are caused to match each other. Hence, the insufficiency of transfer torque of the engagement-side engagement device with respect to the increased input torque is suppressed, and the drop (reduction) in output torque with respect to the wheel required torque is suppressed. In the example illustrated in FIG. 6, there is substantially no drop in output torque with respect to the wheel required torque, and constant output torque is output with respect to constant wheel required torque. That is, the drop in output torque with respect to the wheel required torque is equal to or less than the set amount (SP) during the torque phase. In the example of FIG. 6, the wheel required torque is constant. If the wheel required torque is increased, however, the output torque is also increased accordingly. In addition, after the start of the torque phase control, the speed change control section 43 gradually decreases the hydraulic pressure command for the disengagement-side engagement device from the disengagement-side reference pressure to the stroke end pressure or less in an engagement pressure decrease period (from time T12 to time T13) set in advance to a shorter period than the input torque variation period.

In the case where the hydraulic pressure command for the engagement-side engagement device is increased at a further advanced phase with respect to the increase in input torque, the engagement pressure (hydraulic pressure) for the engagement-side engagement device is preferably varied at a variation rate that is higher than the constant variation rate at the time of the start of the variation after the start of the torque phase control. In this case as well, the constant variation rate (reference variation rate) can be set in the same manner as described above. In the embodiment, the speed change control section 43 varies the hydraulic pressure for the engagement-side engagement device along a variation line L2 in an arcuate shape (in an upwardly convex arcuate shape) with a higher variation rate at the time of the start of the variation than the reference variation rate which is constant in the specific engagement pressure control. That is, in the case of the embodiment, the speed change control section 43 increases the hydraulic pressure command for the engagement-side engagement device from the stroke end pressure to the variation engagement pressure at which the post-shifting input torque can be transferred along the variation line L2 in an engagement pressure variation period (from time T12 to time T13) set in advance to a shorter period than the input torque variation period (from time T12 to time T14) as indicated by the dash-and-dot line in FIG. 6. Here, the variation rate at the time of the start of the variation is preferably set after being adapted in advance through an experiment or the like such that the phase of the changes in input torque and the phase of the variations in actual engagement pressure for the engagement-side engagement device match each other. Alternatively, the variation rate at the time of the start of the variation may be set by multiplying the reference variation rate by a coefficient set in advance to a value that is larger than one. Here, the curve of the variation line L2 may have the shape of a quadric curve or an arc, for example.

<Inertia Phase Control>

After the start of the torque phase control (in the example, after the end of the torque phase control), the speed change control section 43 starts the inertia phase control (time T14). In the inertia phase control, the speed change control section 43 performs rotation variation control in which the rotational speed of the input shaft I is varied by increasing the rotational speed difference ΔW1 for the disengagement-side engagement device and decreasing the rotational speed difference ΔW2 for the engagement-side engagement device. In the embodiment, the speed change control section 43 is configured to vary the rotational speed of the input shaft I by varying at least the input torque in the inertia phase control during shifting. The speed change control section 43 is configured to cause variations in rotation of the input shaft I by varying the input torque from the post-shifting input torque. In the case of an upshift illustrated in FIG. 6, the speed change control section 43 lowers the rotational speed of the input shaft I from a pre-shifting synchronous rotational speed to a post-shifting synchronous rotational speed by lowering the input torque from the post-shifting input torque by inertia torque ΔTin (from time T14 to time T15). On the other hand, in the case of a downshift, although not illustrated, the speed change control section 43 increases the rotational speed of the input shaft I from the pre-shifting synchronous rotational speed to the post-shifting synchronous rotational speed by increasing the input torque from the post-shifting input torque by the inertia torque ΔTin.

The pre-shifting synchronous rotational speed is the rotational speed of the input shaft I for a case where the rotational speed difference ΔW1 between the engagement members of the disengagement-side engagement device is assumed to be zero. The speed change control section 43 calculates the pre-shifting synchronous rotational speed by multiplying the rotational speed of the output shaft O by the speed ratio before shifting. The rotational speed difference between the rotational speed of the input shaft I and the pre-shifting synchronous rotational speed is proportional to the rotational speed difference ΔW1 of the disengagement-side engagement device. Therefore, the speed change control section 43 is configured to determine the rotational speed difference ΔW1 for the disengagement-side engagement device in accordance with the rotational speed difference between the rotational speed of the input shaft I and the pre-shifting synchronous rotational speed.

The post-shifting synchronous rotational speed is the rotational speed of the input shaft I for a case where the rotational speed difference ΔW2 between the engagement members of the engagement-side engagement device is assumed to be zero. The speed change control section 43 calculates the post-shifting synchronous rotational speed by multiplying the rotational speed of the output shaft O by the speed ratio after shifting. The rotational speed difference between the rotational speed of the input shaft I and the post-shifting synchronous rotational speed is proportional to the rotational speed difference ΔW2 of the engagement-side engagement device. Therefore, the speed change control section 43 is configured to determine the rotational speed difference ΔW2 for the engagement-side engagement device in accordance with the rotational speed difference between the rotational speed of the input shaft I and the post-shifting synchronous rotational speed.

The speed change control section 43 is configured to maintain the engagement pressure for the engagement-side engagement device at the variation engagement pressure at which the post-shifting input torque can be transferred in a period for the inertia phase control (from time T14 to time T15). Consequently, the post-shifting input torque can be transferred to the output shaft O via the engagement-side engagement device in the slipping engagement state, and the output torque can be maintained at torque that matches the wheel required torque, also during the inertia phase control.

When the rotational speed difference ΔW2 for the engagement-side engagement device becomes equal to or less than a determination speed difference determined in advance at time T15, the speed change control section 43 ends shifting by causing the engagement-side engagement device to transition to the direct engagement state by increasing the engagement pressure for the engagement-side engagement device to the complete engagement pressure.

<Flowchart>

Figure 7:
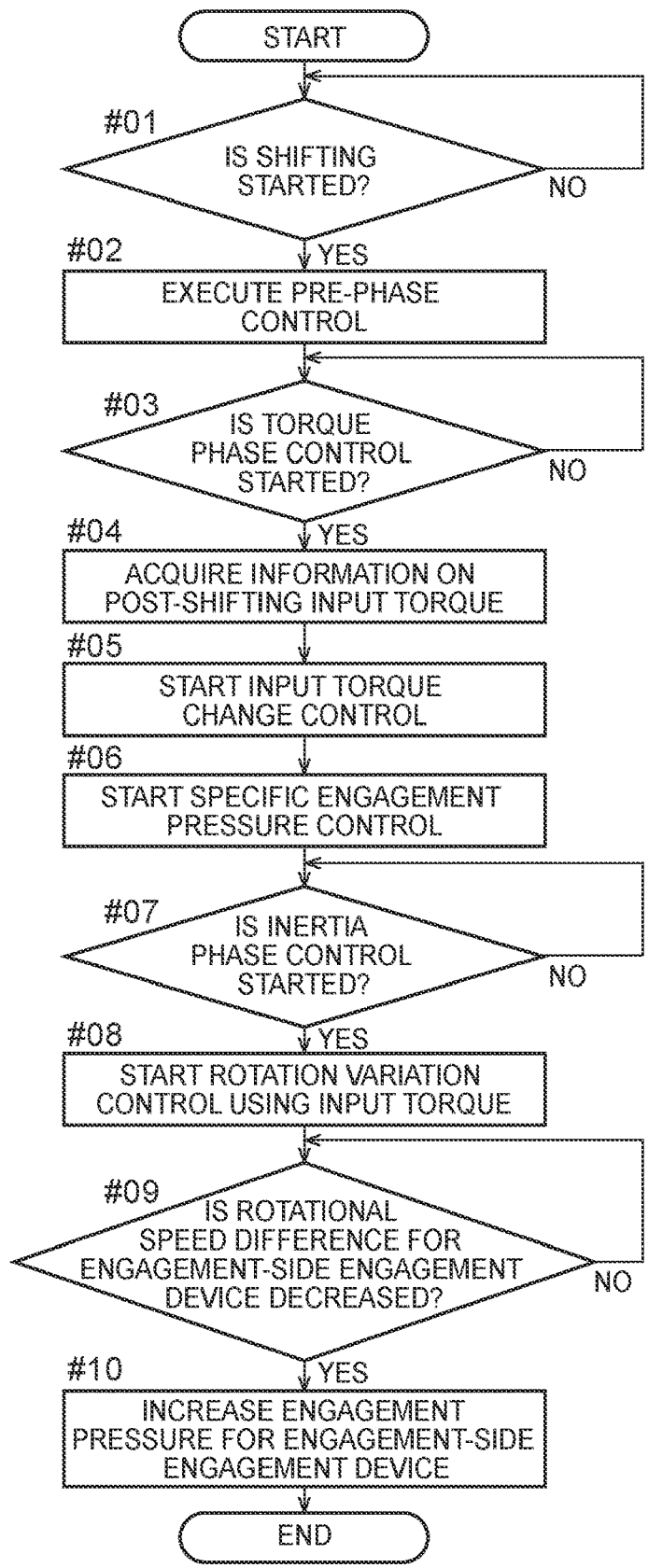
FIG. 7 is a flowchart according to the first embodiment.

Next, the process of the shifting will be described with reference to the flowchart of FIG. 7.

First, the speed change control section 43 determines whether or not a condition for starting shifting is met (step #01). In the case where the condition for starting shifting is met (step #01: Yes), the speed change control section 43 performs the pre-phase control in which the engagement pressures for the disengagement-side engagement device and the engagement-side engagement device are varied in advance as described above (step #02). After the pre-phase control is ended, the speed change control section 43 determines that the condition for starting the torque phase control is met (step #03: Yes), and starts the torque phase control. In the torque phase control, the speed change control section 43 varies the distribution of torque transfer between the engagement-side engagement device and the disengagement-side engagement device by controlling the engagement pressures for the engagement-side engagement device and the disengagement-side engagement device. After the start of the torque phase control, the speed change control section 43 receives, from the control section for the drive force source 3, information on the post-shifting input torque which can be actually output from the drive force source 3 (step #04). After the start of the torque phase control, the speed change control section 43 starts the input torque change control in which the input torque is changed to the post-shifting input torque during the torque phase control (step #05). In addition, after the start of the torque phase control, the engagement-side control section 46 starts the specific engagement pressure control in which the engagement pressure for the engagement-side engagement device is varied at a constant variation rate or a variation rate that is higher than the constant variation rate at the time of the start of the variation (step #06). In the embodiment, the speed change control section 43 performs the front-loaded engagement pressure variation control in which a command value for varying the engagement pressure for the engagement-side engagement device is varied at an advanced phase with respect to the changes in input torque so that the actual engagement pressure for the engagement-side engagement device is increased in phase with the changes in input torque in the specific engagement pressure control.

After the torque phase control is ended, the speed change control section 43 determines that the condition for starting the inertia phase control is met (step #07: Yes), and starts the inertia phase control. After the start of the inertia phase control, the speed change control section 43 starts the rotation variation control in which the rotational speed of the input shaft I is varied by varying at least the input torque (step #08). In the case where the rotational speed difference ΔW2 for the engagement-side engagement device becomes equal to or less than a determination speed difference determined in advance (step #09: Yes), the speed change control section 43 increases the engagement pressure for the engagement-side engagement device to the complete engagement pressure (step #10), and ends shifting.

2. Second Embodiment

In the first embodiment described above, the speed change control section 43 is configured to change the input torque to the post-shifting input torque and increase the hydraulic pressure command for the engagement-side engagement device at an advanced phase with respect to the changes in input torque so that the actual engagement pressure for the engagement-side engagement device is increased in phase with the changes in input torque during the torque phase control in the input torque change control. However, the present disclosure is not limited thereto. The timing of execution of the input torque change control in which the input torque which is transferred from the drive force source 3 to the speed change device TM is changed may be any timing during shifting as long as the speed change control section 43 performs the input torque change control during shifting. In addition, the phase may be advanced to any degree as long as the speed change control section 43 varies the command value for varying the engagement pressure for the engagement-side engagement device at an advanced phase with respect to the changes in input torque due to the input torque change control. For example, the speed change control section 43 may be configured to change the input torque to the post-shifting input torque corresponding to the torque which is input after the end of shifting during the inertia phase control (during variations in rotational speed of the input shaft I) in the input torque change control.

Figure 9:
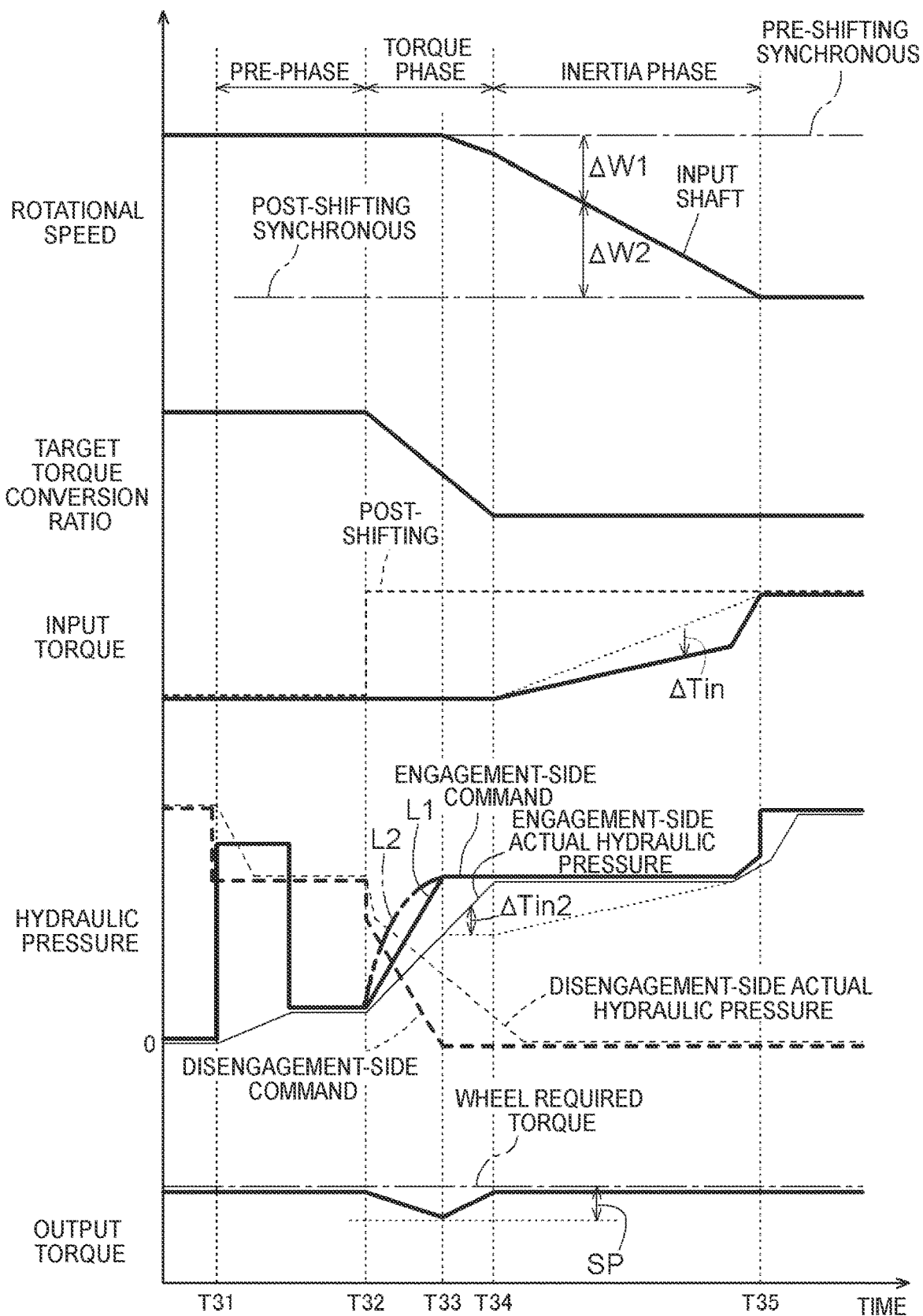
FIG. 9 is a timing chart according to the second embodiment.

Such a case will be described with reference to the exemplary timing chart illustrated in FIG. 9. FIG. 9 illustrates an example of the case of the same power-on upshift as that of FIG. 6, and portions that are common to FIG. 6 and the first embodiment will not be described. The speed change control section 43 changes the input torque to the post-shifting input torque during the inertia phase control (from time T34 to time T35). In addition, the speed change control section 43 executes the rotation variation control in which the rotational speed of the input shaft I is varied by varying the input torque during the inertia phase control. Meanwhile, the speed change control section 43 executes the specific engagement pressure control and the front-loaded engagement pressure variation control in the torque phase control (from time T32 to time T34). Therefore, the variations in command value for varying the engagement pressure for the engagement-side engagement device in the torque phase control are advanced in phase with respect to the changes in input torque in the inertia phase control. In the embodiment as well, the specific engagement pressure control is control in which the engagement pressure for the engagement-side engagement device is varied at a constant variation rate or a variation rate that is higher than the constant variation rate at the time of the start of the variation. In the example, as in the first embodiment described above, the engagement pressure (hydraulic pressure) for the engagement-side engagement device is varied along the variation line L1 with the reference variation rate which is constant, or along the variation line L2 in an arcuate shape (in an upwardly convex arcuate shape) with a higher variation rate at the time of the start of the variation than the reference variation rate which is constant, in the specific engagement pressure control. In FIG. 9, the variation line L2 in an arcuate shape is indicated by the dash-and-dot line.

Although the engagement pressure for the engagement-side engagement device is increased to the variation engagement pressure at which the post-shifting input torque can be transferred to the wheel W side in the torque phase control, the input torque is not increased from the pre-shifting input torque in the torque phase control (from time T32 to time T34). Therefore, in the torque phase control, as the relationship of torque transfer transitions from a state with the shift speed before shifting to a state with the shift speed after shifting, the torque conversion ratio (speed ratio) is decreased, and the output torque is lowered (from time T32 to time T33). Meanwhile, the engagement pressure for the engagement-side engagement device is gradually increased to the variation engagement pressure at which the post-shifting input torque, which is larger than the pre-shifting input torque, can be transferred to the wheel W side. When torque transferred from the input shaft I to the output shaft O side via the disengagement-side engagement device in the direct engagement state and the engagement-side engagement device in the slipping engagement state exceeds the pre-shifting input torque at time T33, the disengagement-side engagement device is brought into the slipping engagement state, and the rotational speed of the input shaft I starts lowering from the pre-shifting synchronous rotational speed. In addition, the output torque which is transferred to the output shaft O via the disengagement-side engagement device in the slipping engagement state and the engagement-side engagement device in the slipping engagement state is gradually increased from torque matching the pre-shifting input torque to the wheel required torque (from time T33 to time T34). In this way, even in a state in which the input torque remains the pre-shifting input torque in the torque phase control, the engagement pressure for the engagement-side engagement device is increased to the variation engagement pressure at which the post-shifting input torque can be transferred at an advanced phase. Thus, while the output torque is slightly decreased from the wheel required torque during the torque phase control, the output torque can be increased to the wheel required torque after the end of the torque phase control. In the example illustrated in FIG. 9, the drop in output torque with respect to the wheel required torque which is constant is suppressed to be small. The drop in output torque with respect to the wheel required torque is equal to or less than the set amount (SP) during the torque phase. In the example of FIG. 9, the wheel required torque is constant. If the wheel required torque is increased, however, the output torque is also increased accordingly.

An amount of torque by which the torque which is transferred from the input shaft I to the output shaft O side via the disengagement-side engagement device and the engagement-side engagement device exceeds the pre-shifting input torque acts as inertia torque ΔTin2 which lowers the rotational speed of the input shaft I. Therefore, the speed change control section 43 decreases the inertia torque ΔTin of the input torque which is varied for variations in rotation of the input shaft I by an amount corresponding to the inertia torque ΔTin2 due to torque transfer by the engagement devices (from time T33 to time T35).

Figure 8:
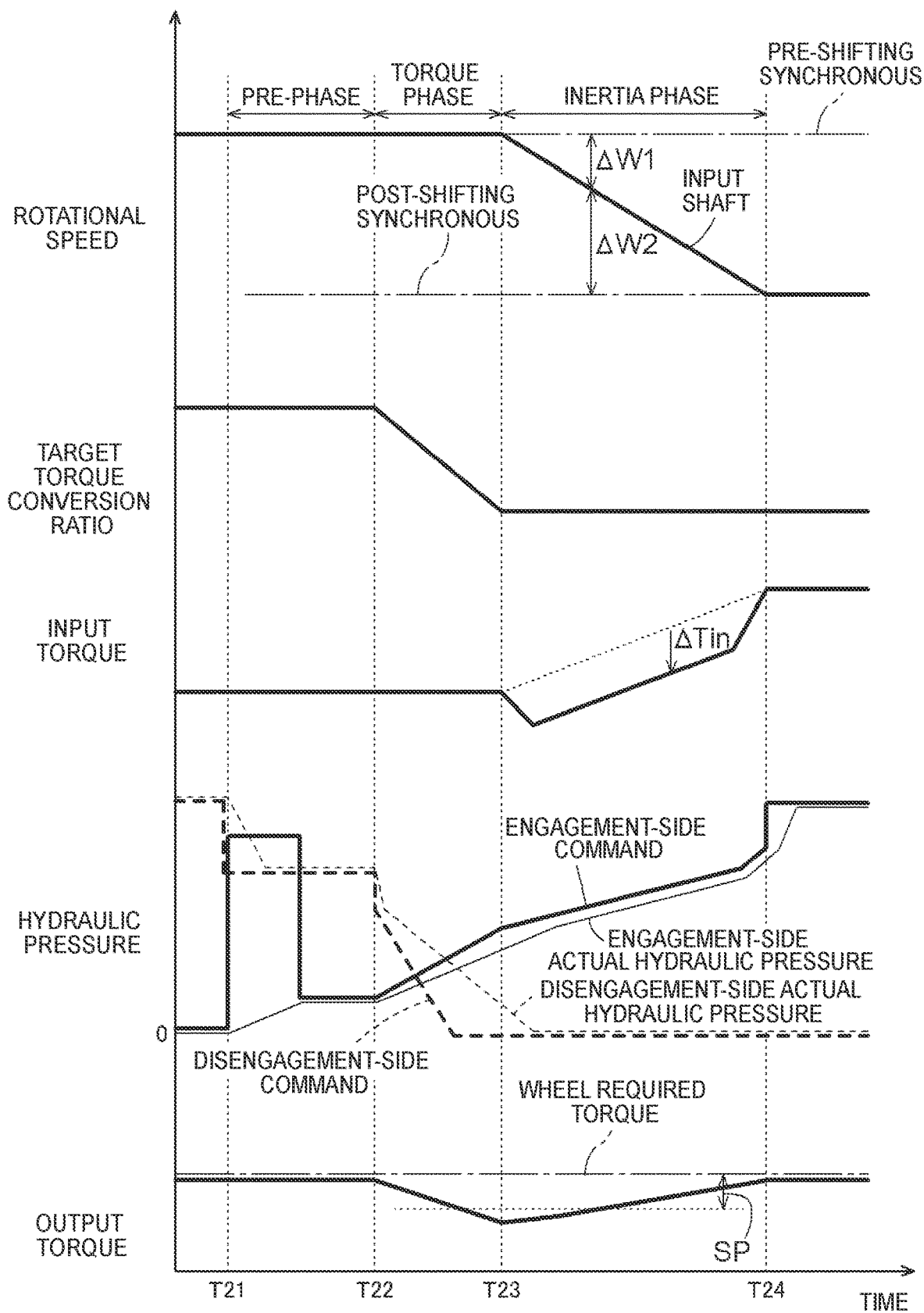
FIG. 8 is a timing chart according to a comparative example of a second embodiment.

FIG. 8 illustrates a timing chart according to a comparative example in contrast to FIG. 9. In the example of FIG. 8, unlike the case of FIG. 9, the engagement pressure for the engagement-side engagement device is not increased to the variation engagement pressure at which the post-shifting input torque can be transferred, but increased to an engagement pressure at which the pre-shifting input torque can be transferred, in the torque phase control (from time T22 to time T23). Therefore, even if the engagement pressure for the engagement-side engagement device is increased in the torque phase control, the torque which is transferred from the input shaft I to the output shaft O side via the engagement-side engagement device and the disengagement-side engagement device does not exceed the pre-shifting input torque, the output torque is lowered as the torque conversion ratio (speed ratio) is decreased, and the amount of reduction in output torque with respect to the wheel required torque is large compared to the case of FIG. 9 (from time T22 to time T23). Therefore, the drop in output torque with respect to the wheel required torque is larger than a set amount SP during a torque phase. In the example of FIG. 8, in addition, the engagement pressure for the engagement-side engagement device is gradually increased from the engagement pressure at which the pre-shifting input torque can be transferred to the variation engagement pressure at which the post-shifting input torque can be transferred as the input torque is increased to the post-shifting input torque in the inertia phase control (from time T23 to time T24). Therefore, the output torque is gradually increased from the output torque corresponding to the pre-shifting input torque to the wheel required torque in a period for the inertia phase control. In this way, the engagement pressure for the engagement-side engagement device is not increased to the variation engagement pressure in the torque phase control as in the example of FIG. 9. Thus, the amount of reduction in output torque with respect to the wheel required torque is large, and the period for the reduction in output torque is long, compared to the example of FIG. 9. In this way, the effect in suppressing the reduction in output torque in the example of FIG. 9 can be understood through a comparison with the example of FIG. 8.

Figure 10:
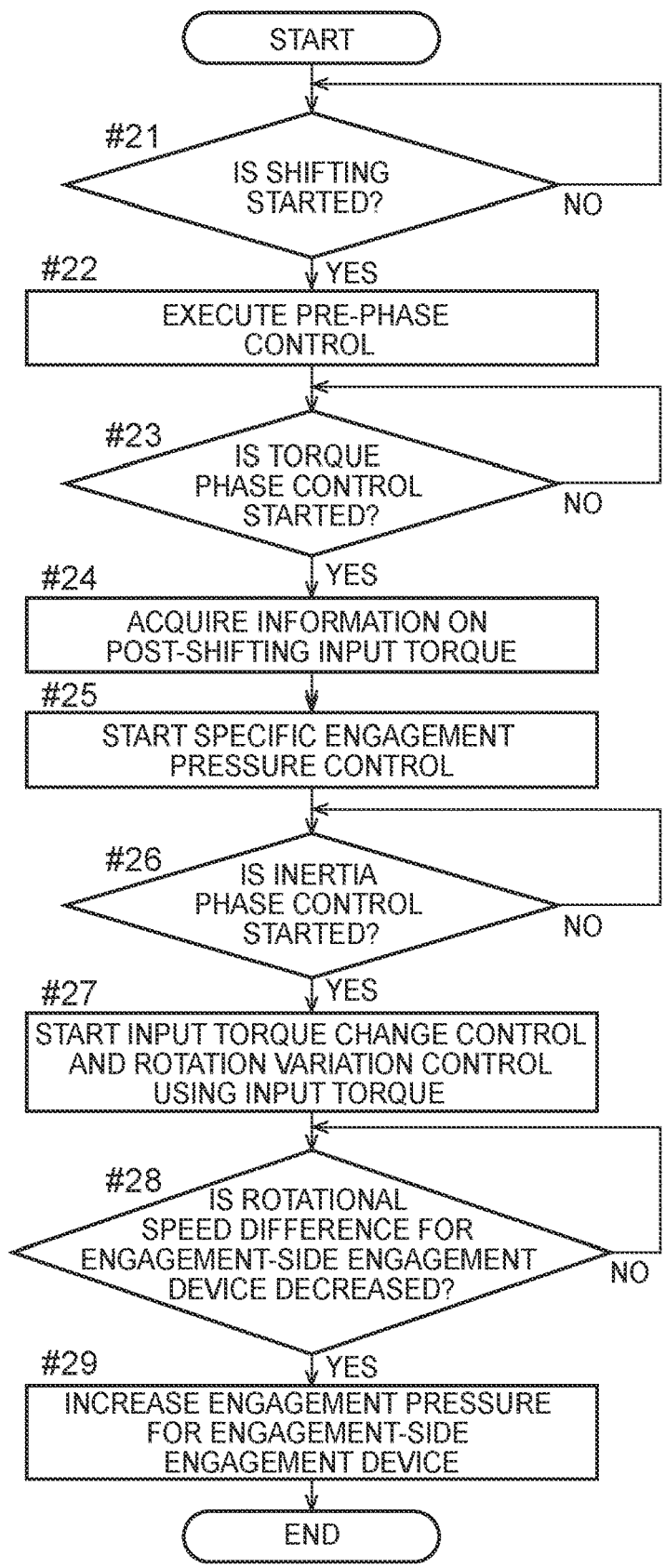
FIG. 10 is a flowchart according to the second embodiment.

Next, the process of the shifting illustrated in the example of FIG. 9 will be described with reference to the flowchart of FIG. 10.

First, the speed change control section 43 determines whether or not a condition for starting shifting is met (step #21). In the case where the condition for starting shifting is met (step #21: Yes), the speed change control section 43 performs the pre-phase control in which the engagement pressures for the disengagement-side engagement device and the engagement-side engagement device are varied in advance as described above (step #22). After the pre-phase control is ended, the speed change control section 43 determines that the condition for starting the torque phase control is met (step #23: Yes), and starts the torque phase control. In the torque phase control, the speed change control section 43 varies the distribution of torque transfer between the engagement-side engagement device and the disengagement-side engagement device by controlling the engagement pressures for the engagement-side engagement device and the disengagement-side engagement device. After the start of the torque phase control, the speed change control section 43 receives, from the control section for the drive force source 3, information on the post-shifting input torque which can be actually output from the drive force source 3 (step #24). After the start of the torque phase control, the speed change control section 43 starts the specific engagement pressure control in which the engagement pressure for the engagement-side engagement device is varied at a constant variation rate or a variation rate that is higher than the constant variation rate at the time of the start of the variation (step #25).

After the torque phase control is ended, the speed change control section 43 determines that the condition for starting the inertia phase control is met (step #26: Yes), and starts the inertia phase control. After the start of the inertia phase control, the speed change control section 43 starts the input torque change control in which the input torque is varied to the post-shifting input torque, and starts the rotation variation control in which the rotational speed of the input shaft I is varied by varying at least the input torque, during the inertia phase control (step #27).

In the case where the rotational speed difference ΔW2 for the engagement-side engagement device becomes equal to or less than a determination speed difference determined in advance (step #28: Yes), the speed change control section 43 increases the engagement pressure for the engagement-side engagement device to the complete engagement pressure (step #29), and ends shifting.

3. Other Embodiments

Lastly, other embodiments will be described. The configuration of each embodiment described below is not limited to its independent application, and may be applied in combination with the configuration of other embodiments unless any contradiction occurs.

(1) In the embodiment described above, the control device 30 includes the plurality of control units 32 to 34, and the plurality of control units 32 to 34 include the plurality of functional sections 41 to 45 in a distributed manner. However, the present disclosure is not limited thereto. The control device 30 may include the plurality of control units 32 to 34 discussed above as control devices integrated or separated in any combination. The plurality of functional sections 41 to 45 may also be distributed in any combination.

(2) In the embodiment described above, the speed change device TM has two planetary gear mechanisms, has six engagement devices, and provides six forward shift speeds, and each of the shift speeds is established by engaging two of the engagement devices. However, the present disclosure is not limited thereto. The speed change device TM may have any configuration as long as the speed change device TM provides two or more shift speeds established by engaging at least two or more engagement devices. That is, the speed change device TM may have one or two or more planetary gear mechanisms, may have three or more engagement devices, and may provide two or more forward shift speeds, and each of the shift speeds may be established by engaging two of the engagement devices, or by engaging three or more of the engagement devices.

(3) In the embodiment described above, the speed change control section 43 is configured to start the inertia phase control (variations in rotation of the input shaft I) after the end of the torque phase control (variations in distribution of torque transfer). However, the present disclosure is not limited thereto. The speed change control section 43 may start variations in distribution of torque transfer before variations in rotation of the input shaft I are caused, and may start the inertia phase control while the torque phase control is performed.

(4) In the embodiment described above, the speed change control section 43 performs shifting (input torque change control and front-loaded engagement pressure variation control) using the engagement-side control section 46, the disengagement-side control section 47, and the input torque change section 48 in the case where a power-on upshift is performed in the shifting. However, the present disclosure is not limited thereto. The speed change control section 43 may be configured to perform shifting (input torque change control and specific engagement pressure control) using the engagement-side control section 46, the disengagement-side control section 47, and the input torque change section 48 in the case where a power-off downshift which is shifting in which switching is made to a shift speed with a higher speed ratio is performed in a state in which the input torque is negative torque in the direction of decelerating the vehicle in the shifting. In this case, the input torque is changed in the direction of decreasing the input torque in the input torque change control, and the rotational speed of the input shaft I is increased in the rotation variation control.

(5) In the embodiment described above, the speed change control section 43 is configured to receive, from the control section for the drive force source 3, information on the post-shifting input torque which can be actually output from the drive force source 3. However, the present disclosure is not limited thereto. The speed change control section 43 may be configured to include data such as an output characteristic map for the internal combustion engine ENG or the rotary electric machine MG, calculate maximum torque of the internal combustion engine ENG on the basis of a drive condition such as the rotational speed of the internal combustion engine ENG, calculate maximum torque of the rotary electric machine MG on the basis of a drive condition such as the rotational speed of the rotary electric machine MG and the charge amount of the battery, and acquire information on the post-shifting input torque which can be actually output from the drive force source 3.

(6) In the embodiment described above, the engagement-side engagement device and the disengagement-side engagement device are configured such that the engagement pressure (transfer torque capacity) is increased by increasing the supply hydraulic pressure (hydraulic pressure command). However, the present disclosure is not limited thereto. One or both of the engagement-side engagement device and the disengagement-side engagement device may be configured such that the engagement pressure (transfer torque capacity) is increased by decreasing the supply hydraulic pressure (hydraulic pressure command). In this case, for example, the engagement devices may be urged toward the engagement side by a return spring, and pressed toward the disengagement side by a hydraulic pressure supplied to the engagement devices. In this case, the speed change control section 43 is configured to increase the engagement pressure for the one or both of the engagement-side engagement device and the disengagement-side engagement device by decreasing the supply hydraulic pressure (hydraulic pressure command) for the one or both of the engagement-side engagement device and the disengagement-side engagement device.

4. Overview of Above Embodiments

The overview of the control device (30) for the vehicle drive transfer device (1) described above will be described below.

There is provided a control device (30) that controls a vehicle drive transfer device (1) in which a speed change device (TM) that includes a plurality of engagement devices and that selectively establishes one of a plurality of shift speeds with different speed ratios in accordance with a state of engagement of the plurality of engagement devices is provided in a power transfer path (2) that connects between a drive force source (3) and wheels (W), the control device (30) including: an engagement-side control section (46) that controls an engagement pressure for an engagement-side engagement device which is one of the engagement devices that is engaged to perform shifting in which switching is made to a shift speed with a different speed ratio; a disengagement-side control section (47) that controls an engagement pressure for a disengagement-side engagement device which is one of the engagement devices that is disengaged to perform the shifting; and an input torque change section (48) that changes input torque transferred from a drive force source (3) side to an input shaft (I) of the speed change device (TM) during the shifting. When distribution of torque transfer between the engagement-side engagement device and the disengagement-side engagement device is varied by the engagement-side control section (46) and the disengagement-side control section (47) by controlling the engagement pressures for the engagement-side engagement device and the disengagement-side engagement device during the shifting, the engagement-side control section (46) performs specific engagement pressure control in which the engagement pressure for the engagement-side engagement device is varied at a constant variation rate or a variation rate that is higher than the constant variation rate at a time of start of variation.

With such a configuration, the input torque change section (48) changes the input torque during the shifting, and thus it is possible to control variations in output torque transferred from the speed change device (TM) to a wheel (W) side in a period since before the start of the shifting until after the end of the shifting. In addition, when the distribution of torque transfer between the engagement-side engagement device and the disengagement-side engagement device is varied by the engagement-side control section (46) and the disengagement-side control section (47) by controlling the engagement pressures for the engagement-side engagement device and the disengagement-side engagement device, the output torque which matches the engagement pressure for the engagement-side engagement device in the slipping engagement state is transferred to the wheel (W) side. When the distribution of torque transfer is varied, the engagement-side control section (46) performs the specific engagement pressure control in which the engagement pressure for the engagement-side engagement device is varied at a constant variation rate or a variation rate that is higher than the constant variation rate at the time of the start of the variation. Such specific engagement pressure control is enabled by varying the engagement pressure for the engagement-side engagement device on the basis of the value of the input torque, which is changed by the input torque change section (48), after the end of the shifting. By performing such specific engagement pressure control, fluctuations in output torque during the shifting can be suppressed.

Preferably, in the case where a power-on upshift which is the shifting in which switching is made to a shift speed with a lower speed ratio is performed in a state in which wheel required torque which is torque required to be transferred to the wheels is constant or increasing, the input torque change section (48) changes the input torque in a direction of increasing the input torque, and the engagement-side control section (46) performs the specific engagement pressure control.

In this case, the vehicle is accelerating with the wheel required torque constant or increasing, and thus smooth shifting can be performed by suppressing fluctuations in output torque as described above. When an upshift is performed, in addition, the speed ratio of the speed change device (TM) is decreased, and therefore the output torque is decreased for the same input torque. With the configuration described above, the input torque is increased by the input torque change section (48). Thus, the amount of reduction in output torque between before the start of shifting and after the end of shifting can be reduced, which allows smooth shifting.

Preferably, a drop in output torque which is torque transferred to the wheels (W) with respect to wheel required torque which is torque required to be transferred to the wheels (W) during variations in distribution of the torque transfer is equal to or less than a set amount (SP).

With this configuration, the drop in actual output torque with respect to the wheel required torque is suppressed to be equal to or less than the set amount. Therefore, smooth shifting can be performed by suppressing fluctuations in output torque due to shifting.

Preferably, the engagement-side control section (46) varies the engagement pressure for the engagement-side engagement device to an engagement pressure at which torque corresponding to the input torque after the shifting is ended can be transferred to the wheel (W) side in the specific engagement pressure control.

With this configuration, the engagement pressure for the engagement-side engagement device is varied to a value of the input torque, which is changed by the input torque change section, after the end of shifting, that is, to an engagement pressure at which the post-shifting input torque can be transferred to the wheel side. Thus, the post-shifting input torque can be transferred to the output shaft since the middle of variations in distribution of torque transfer between the engagement-side engagement device and the disengagement-side engagement device. Consequently, fluctuations in output torque during shifting can be suppressed.

Preferably, variations in distribution of the torque transfer are started before variations in rotation of the input shaft (I) are caused.

With this configuration, the post-shifting input torque can be transferred to the output shaft (O) prior to variations in rotation of the input shaft (I). Therefore, fluctuations in output torque during shifting can be suppressed.

Preferably, the engagement-side control section (46) varies a command value for varying the engagement pressure for the engagement-side engagement device at an advanced phase with respect to changes in the input torque made by the input torque change section (48) in the specific engagement pressure control.

With this configuration, the command value for varying the engagement pressure for the engagement-side engagement device is varied at an advanced phase with respect to the changes in input torque. Therefore, the output torque can be varied to torque output after shifting (wheel required torque) corresponding to the post-shifting input torque earlier than the changes in input torque, and fluctuations in output torque during shifting can be suppressed.

Preferably, the input torque change section (48) changes the input torque which is transferred from the drive force source (3) side to the speed change device (TM) to torque corresponding to torque input after the end of shifting while the distribution of the torque transfer is varied; and the engagement-side control section (46) varies a command value for varying the engagement pressure for the engagement-side engagement device at an advanced phase with respect to changes in the input torque so that an actual engagement pressure for the engagement-side engagement device is varied in phase with the changes in the input torque in the specific engagement pressure control.

While the distribution of torque transfer is varied, the relationship of torque transfer is in a transient state in which the relationship of torque transfer is caused to transition from a state with the shift speed before shifting to a state with the shift speed after shifting. Therefore, the output torque may be fluctuated unless the changes in input torque and the variations in engagement pressure for the engagement-side engagement device are caused at matched timings. However, the actual engagement pressure for an engagement device is varied later than variations in command value. Therefore, the actual engagement pressure for the engagement-side engagement device tends to be varied at a delayed phase with respect to the changes in input torque. With the configuration described above, the actual engagement pressure for the engagement-side engagement device can be varied in phase with the changes in input torque during variations in distribution of torque transfer. Therefore, fluctuations in output torque can be suppressed during the torque phase control.

Preferably, the input torque change section (48) varies the input torque to torque corresponding to the input torque after the shifting is ended during variations in rotational speed of the input shaft (I).

Even if the input torque is changed to the post-shifting input torque during variations in rotational speed of the input shaft (I), the engagement pressure for the engagement-side engagement device is varied at an advanced phase to an engagement pressure at which the post-shifting input torque can be transferred while the distribution of torque transfer is varied. Therefore, while the output torque tends to be fluctuated from the wheel required torque while the distribution of torque transfer is varied, the output torque can be increased to the wheel required torque after the variations in distribution of torque transfer are ended. Hence, the output torque can be varied to the wheel required torque earlier than the changes in input torque, and fluctuations in output torque during shifting can be suppressed.

Preferably, a rotational speed of the input shaft (I) is varied by varying at least the input torque during the shifting.

With this configuration, the rotational speed of the input shaft (I) is varied by varying at least the input torque during the variations in rotational speed of the input shaft (I). Thus, it is possible to suppress fluctuations in output torque transferred to the wheel side in accordance with the engagement pressure for the engagement-side engagement device in the slipping engagement state due to variations in rotation of the input shaft (I).

Preferably, the drive force source (3) includes an internal combustion engine (ENG) and a rotary electric machine (MG), and the rotary electric machine (MG), the speed change device (TM), and the wheels (W) are arranged in this order from an internal combustion engine (ENG) side along the power transfer path (2); and the engagement-side control section (46) performs the specific engagement pressure control in the case where only the rotary electric machine (MG) is caused to operate as the drive force source (3).

In the case where only the rotary electric machine (MG) is caused to operate as the drive force source (3), in general, it is considered to be highly likely that the driver of the vehicle desires smooth travel with little vibration or shock. With this configuration, smooth shifting can be performed by suppressing fluctuations in output torque in such a case. Thus, smooth travel that is highly likely to match the desire of the driver can be achieved.

INDUSTRIAL APPLICABILITY

The technology according to the present disclosure is suitably applicable to a control device that controls a vehicle drive transfer device in which a speed change device that includes a plurality of engagement devices and that selectively establishes one of a plurality of shift speeds with different speed ratios in accordance with the state of engagement of the plurality of engagement devices is provided in a power transfer path that connects between a drive force source and wheels.

The invention claimed is:

1. A control device that controls a vehicle drive transfer device in which a speed change device that includes a plurality of engagement devices and that selectively establishes one of a plurality of shift speeds with different speed ratios in accordance with a state of engagement of the plurality of engagement devices is provided in a power transfer path that connects between a drive force source and wheels, the control device comprising:
an electronic control unit that:
controls an engagement pressure for an engagement-side engagement device which is one of the plurality of engagement devices that is engaged to perform shifting in which switching is made to a shift speed with a different speed ratio;
controls an engagement pressure for a disengagement-side engagement device which is one of the plurality of engagement devices that is disengaged to perform the shifting; and
changes input torque transferred from a drive force source side to an input shaft of the speed change device during the shifting, wherein
when shifting is performed, the electronic control unit performs specific engagement pressure control during a torque phase control in which distribution of torque transfer between the engagement-side engagement device and the disengagement-side engagement device is varied, before performing an inertia phase control in which rotation is varied so as to increase a rotation speed difference between engagement members of the disengagement-side engagement device and decrease a rotational speed difference between engagement members of the engagement-side engagement device, and
immediately after a start of the torque phase control, the engagement pressure for the engagement-side engagement device is increased at a variation rate that is higher than a constant variation rate.

2. The control device for a vehicle drive transfer device according to claim 1, wherein
when a power-on upshift which is the shifting in which switching is made to a shift speed with a lower speed ratio is performed in a state in which wheel required torque which is torque required to be transferred to the wheels is constant or increasing, the electronic control unit changes the input torque in a direction of increasing the input torque, and performs the specific engagement pressure control.

3. The control device for a vehicle drive transfer device according to claim 1, wherein
a decrease in output torque which is torque transferred to the wheels with respect to wheel required torque which is torque required to be transferred to the wheels during variations in distribution of the torque transfer is equal to or less than a set amount.

4. The control device for a vehicle drive transfer device according to claim 1, wherein
the electronic control unit varies the engagement pressure for the engagement-side engagement device to an engagement pressure at which torque corresponding to the input torque after the shifting is ended can be transferred to a wheel side in the specific engagement pressure control.

5. The control device for a vehicle drive transfer device according to claim 1, wherein
variations in distribution of the torque transfer are started before variations in rotation of the input shaft.

6. The control device for a vehicle drive transfer device according to claim 1, wherein
the electronic control unit varies a command value for varying the engagement pressure for the engagement-side engagement device at an advanced phase with respect to changes in the input torque made in the specific engagement pressure control.

7. The control device for a vehicle drive transfer device according to claim 1, wherein:
the electronic control unit changes the input torque which is transferred from the drive force source side to the speed change device while the distribution of the torque transfer is varied; and
the electronic control unit varies a command value for varying the engagement pressure for the engagement-side engagement device at an advanced phase with respect to changes in the input torque so that an actual engagement pressure for the engagement-side engagement device is varied in phase with changes in the input torque in the specific engagement pressure control.

8. The control device for a vehicle drive transfer device according to claim 1, wherein
the electronic control unit changes the input torque to torque corresponding to the input torque after the shifting is ended during variations in rotational speed of the input shaft.

9. The control device for a vehicle drive transfer device according to claim 1, wherein
a rotational speed of the input shaft is varied by varying at least the input torque during the shifting.

10. The control device for a vehicle drive transfer device according to claim 1, wherein:
the drive force source includes an internal combustion engine and a rotary electric machine, and the rotary electric machine, the speed change device, and the wheels are arranged in this order from an internal combustion engine side along the power transfer path; and
the electronic control unit performs the specific engagement pressure control when only the rotary electric machine is caused to operate as the drive force source.

* * * * *